United States Patent
Park

(10) Patent No.: US 8,092,754 B2
(45) Date of Patent: Jan. 10, 2012

(54) CARBON NANOTUBES MASS FABRICATION SYSTEM AND MASS FABRICATION METHOD

(75) Inventor: Yong Hoon Park, Incheon (KR)

(73) Assignee: CNT Co., Ltd (KR)

( * ) Notice: Subject to any disclaimer, the term of this patent is extended or adjusted under 35 U.S.C. 154(b) by 547 days.

(21) Appl. No.: 11/817,714

(22) PCT Filed: Mar. 8, 2006

(86) PCT No.: PCT/KR2006/000806
§ 371 (c)(1),
(2), (4) Date: Sep. 4, 2007

(87) PCT Pub. No.: WO2006/107144
PCT Pub. Date: Oct. 12, 2006

(65) Prior Publication Data
US 2008/0159944 A1    Jul. 3, 2008

(30) Foreign Application Priority Data
Mar. 8, 2005    (KR) .................. 10-2005-0018918

(51) Int. Cl.
*B01J 8/08*    (2006.01)

(52) U.S. Cl. ..... 422/219; 422/213; 422/214; 423/447.3; 977/842

(58) Field of Classification Search ............... 423/447.3; 422/213; 977/843
See application file for complete search history.

(56) References Cited

U.S. PATENT DOCUMENTS

| 5,227,142 A * | 7/1993 | Murai et al. .................. 422/219 |
| 6,413,487 B1 | 7/2002 | Resasco et al. |
| 6,759,025 B2 | 7/2004 | Hong et al. |
| 6,855,301 B1 | 2/2005 | Rich et al. |

FOREIGN PATENT DOCUMENTS

JP    2003238125    *  8/2003

* cited by examiner

*Primary Examiner* — Stuart Hendrickson
*Assistant Examiner* — Richard M Rump
(74) *Attorney, Agent, or Firm* — John K. Park; Park Law Firm

(57) ABSTRACT

Disclosed herein is a mass production system and method of synthesized carbon nanotubes. The system is configured to completely open the reaction chamber to an outside during synthesis of the carbon nanotubes in the reaction chamber while allowing a specific gas to occupy a predetermined region within the reaction chamber, thereby blocking introduction of external air into the reaction chamber which is opened to external air. The system comprises a reaction chamber having at least one opening opened to external air, and at least one different-specific gravity gas occupying region filled with a different specific gravity gas having a different specific gravity from that of the external air to block the external air from being introduced into the reaction chamber through the opening, a carbon nanotube synthesizing unit positioned in the different-specific gravity gas occupying region to synthesize carbon nanotubes by the medium of a catalyst introduced thereto through the opening, a conveying unit to convey the catalyst to the carbon nanotube synthesizing unit through the opening, and a gas supply unit to supply the different specific gravity gas and a carbon source gas used for synthesizing the carbon nanotubes to the different-specific gravity gas occupying region and the carbon nanotube synthesizing unit, respectively.

6 Claims, 9 Drawing Sheets

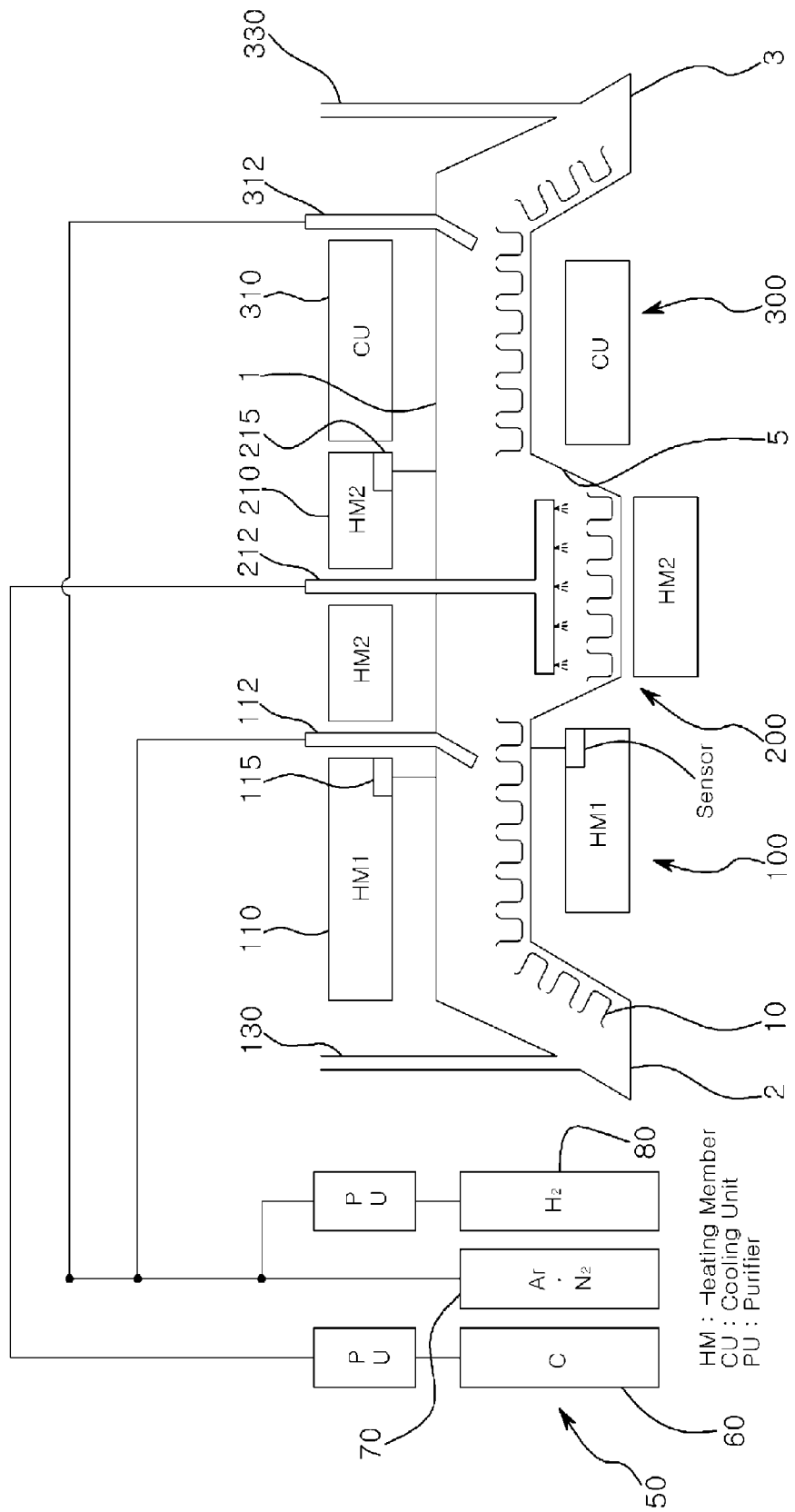
[Fig. 1]

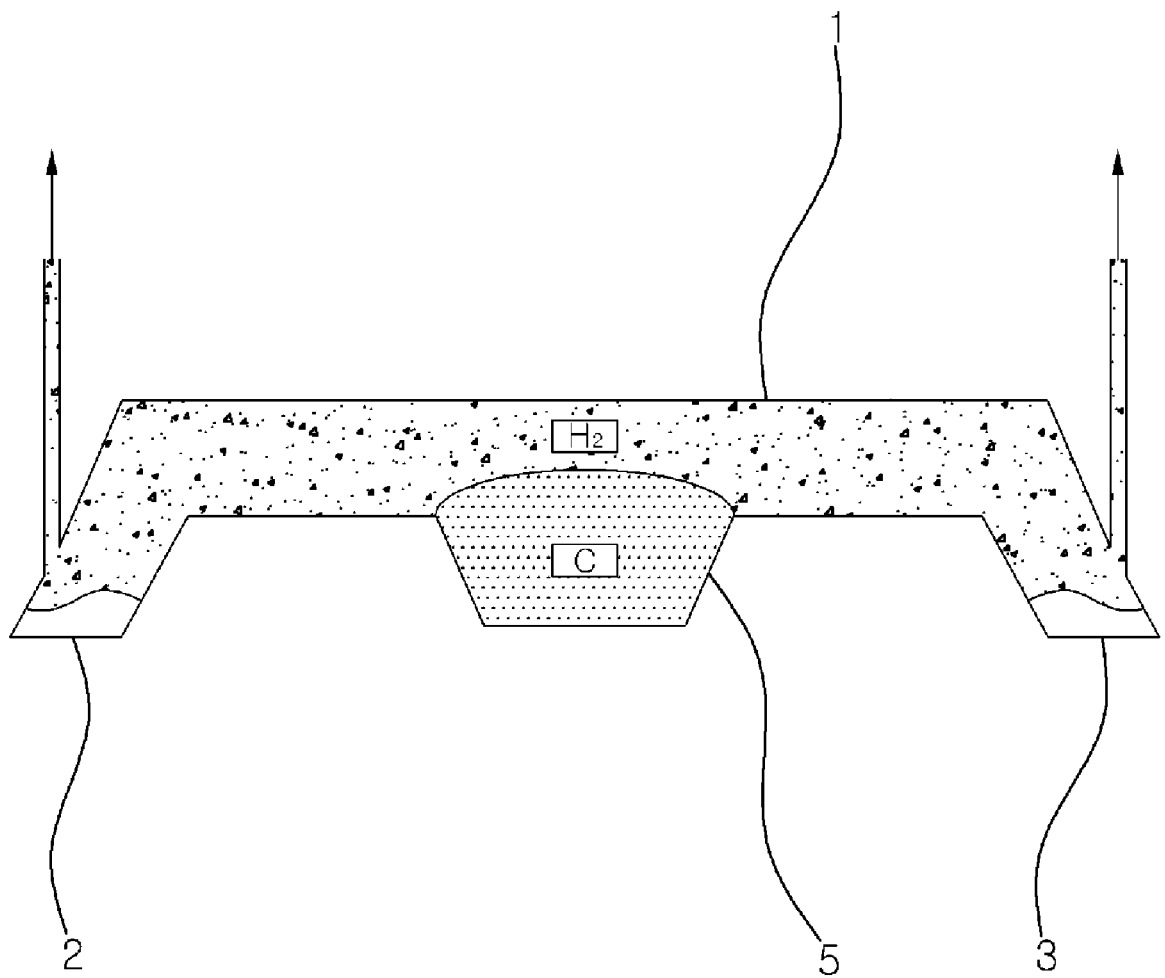
[Fig. 2]

[Fig. 3]
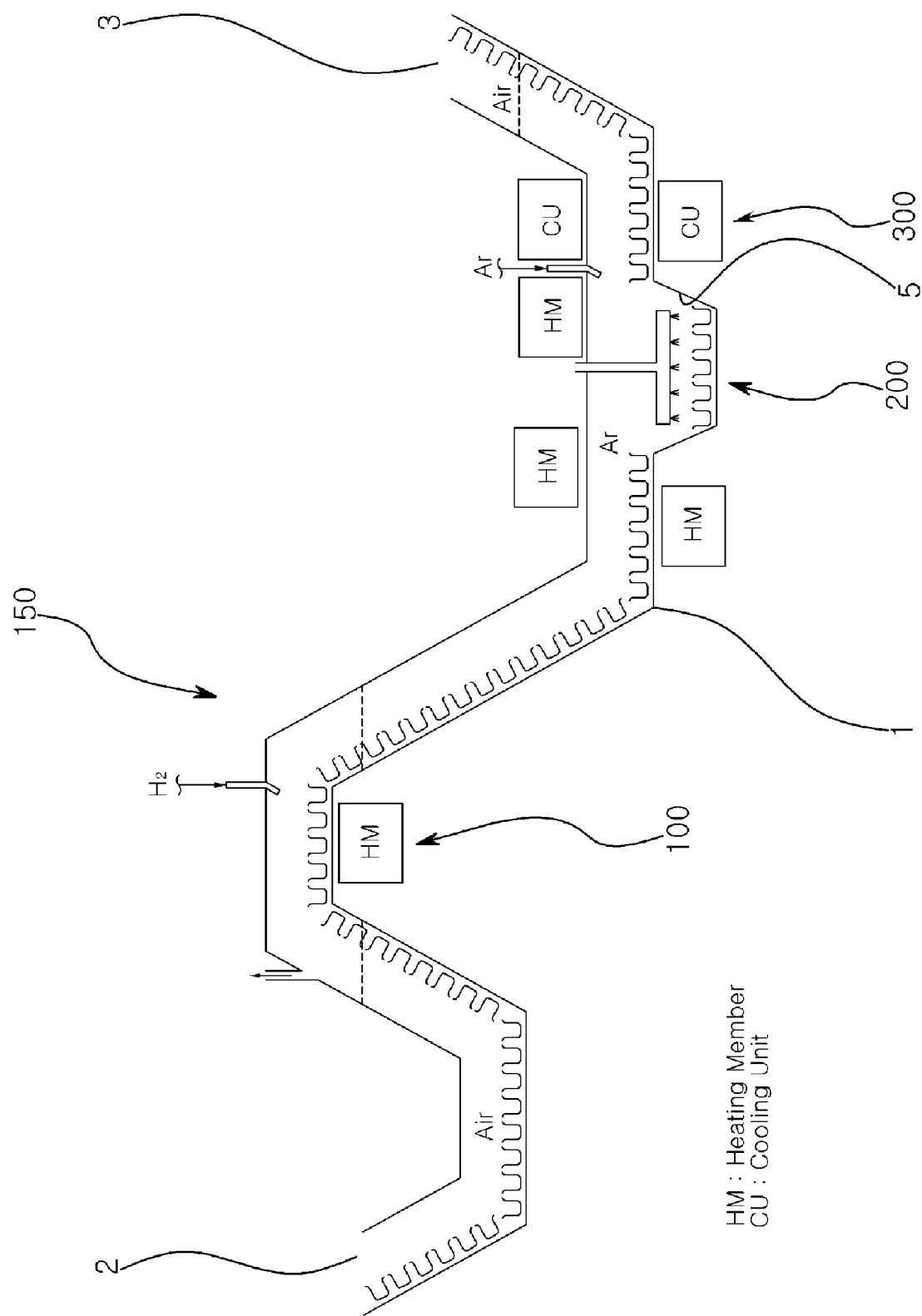

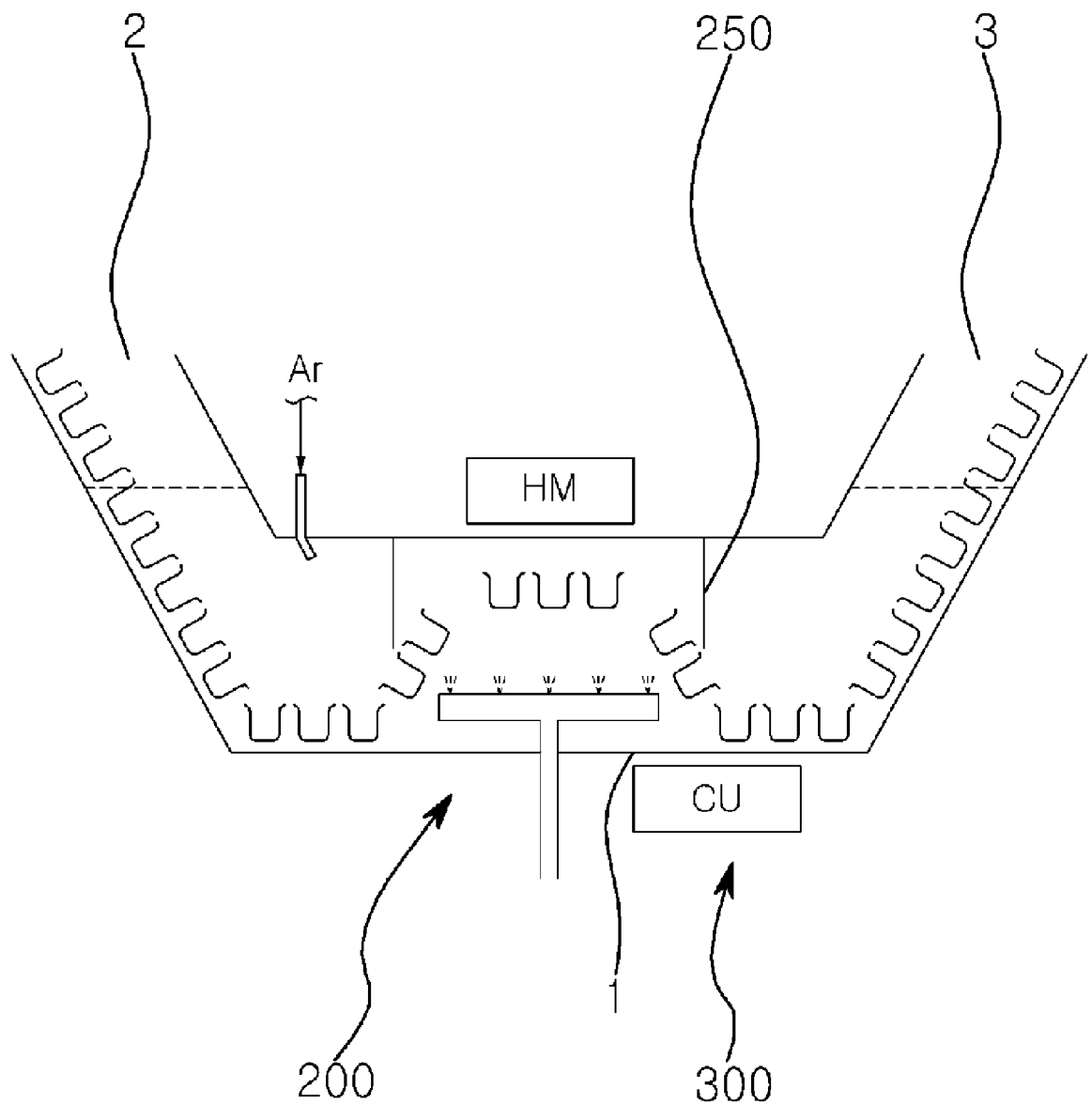
[Fig. 4]

[Fig. 5]
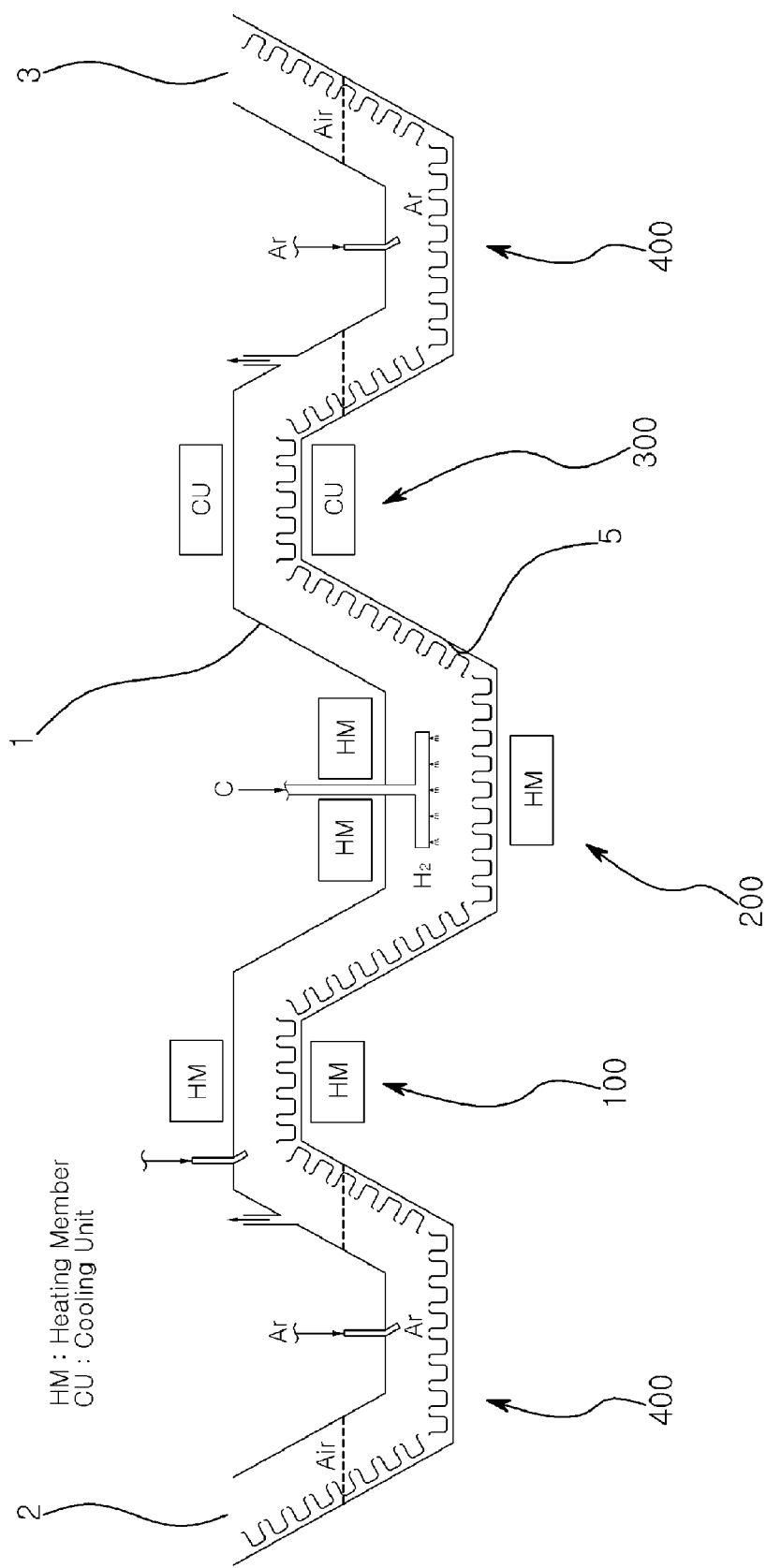

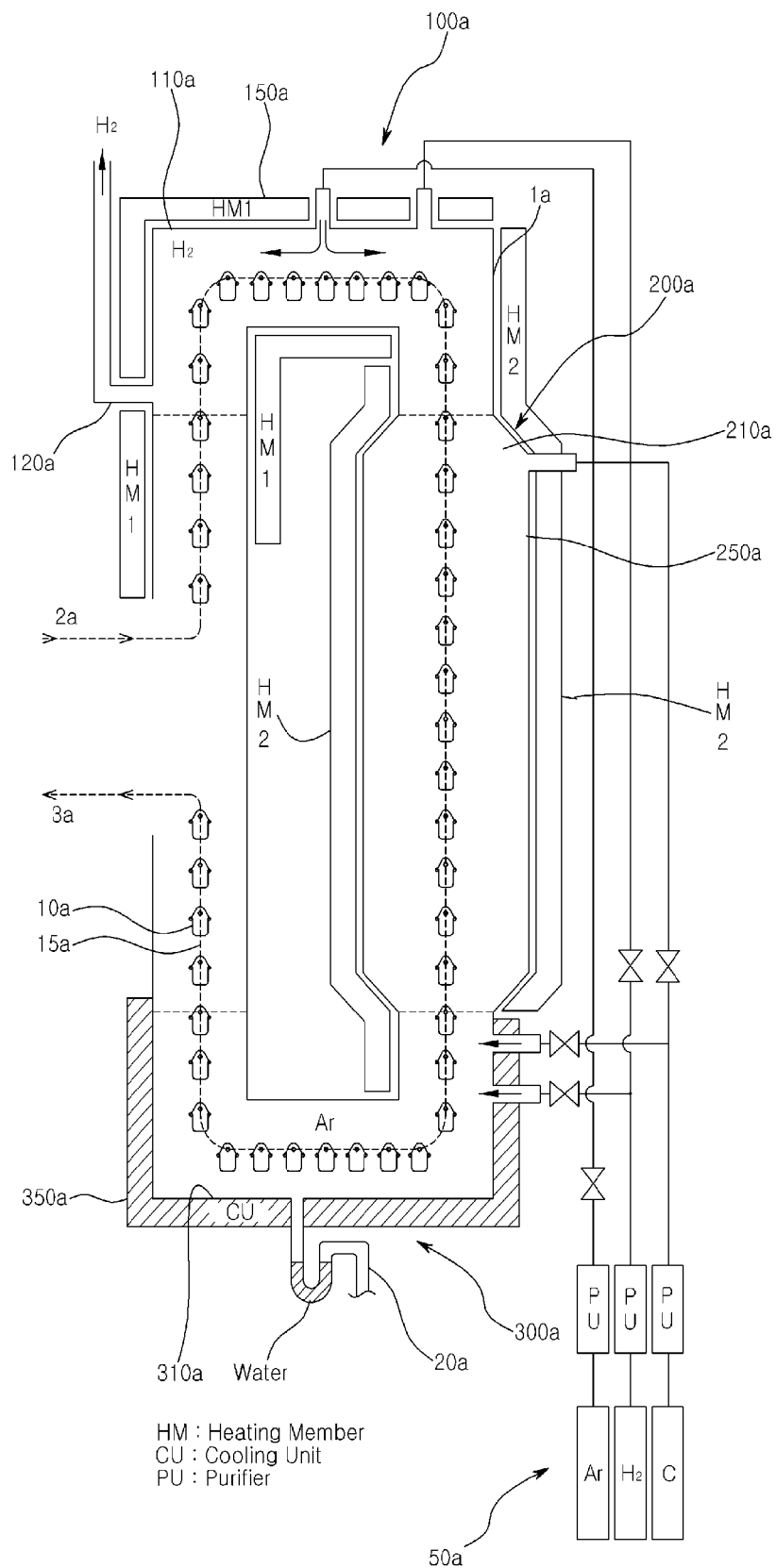
[Fig. 6]

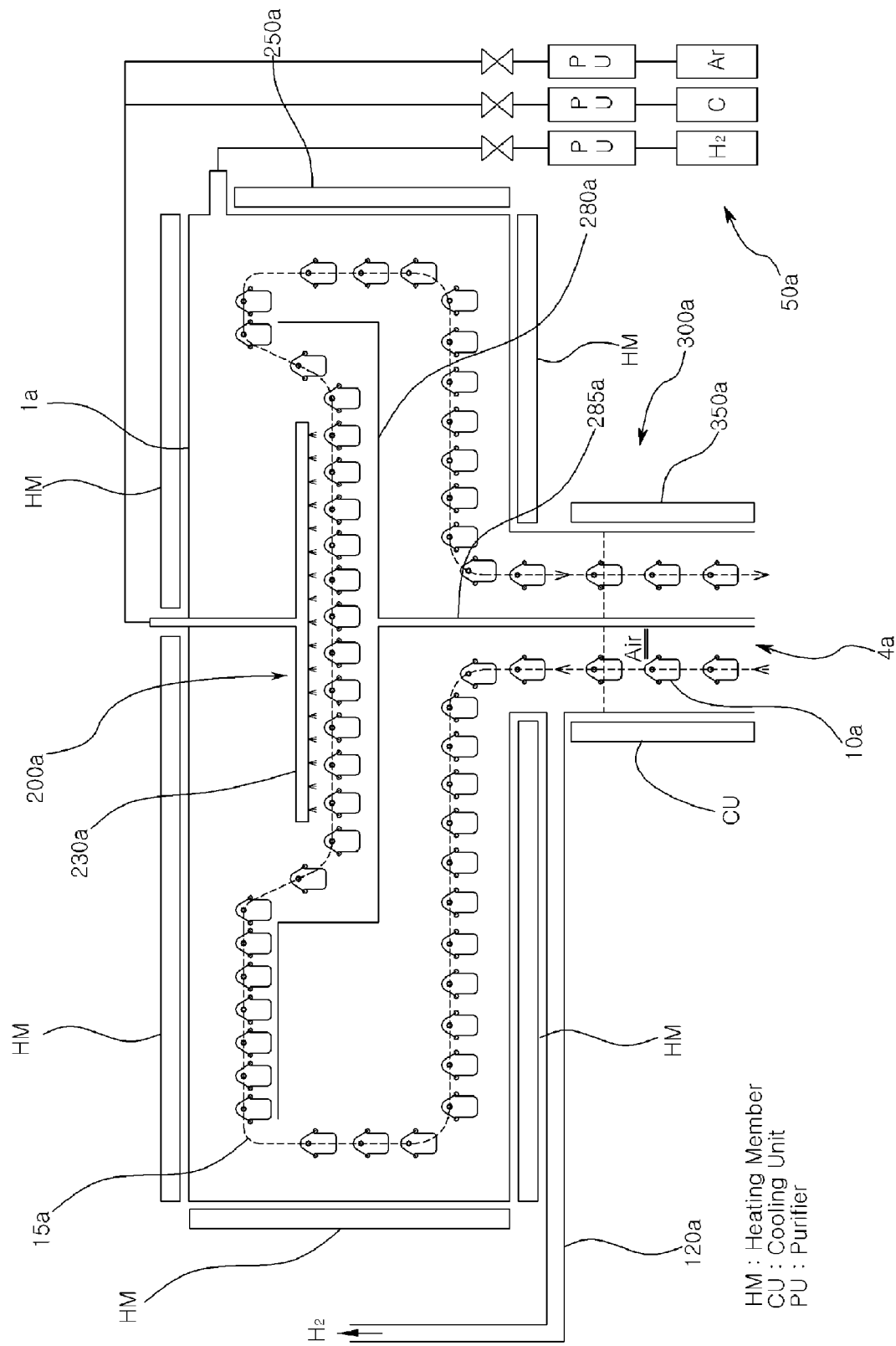
[Fig. 7]

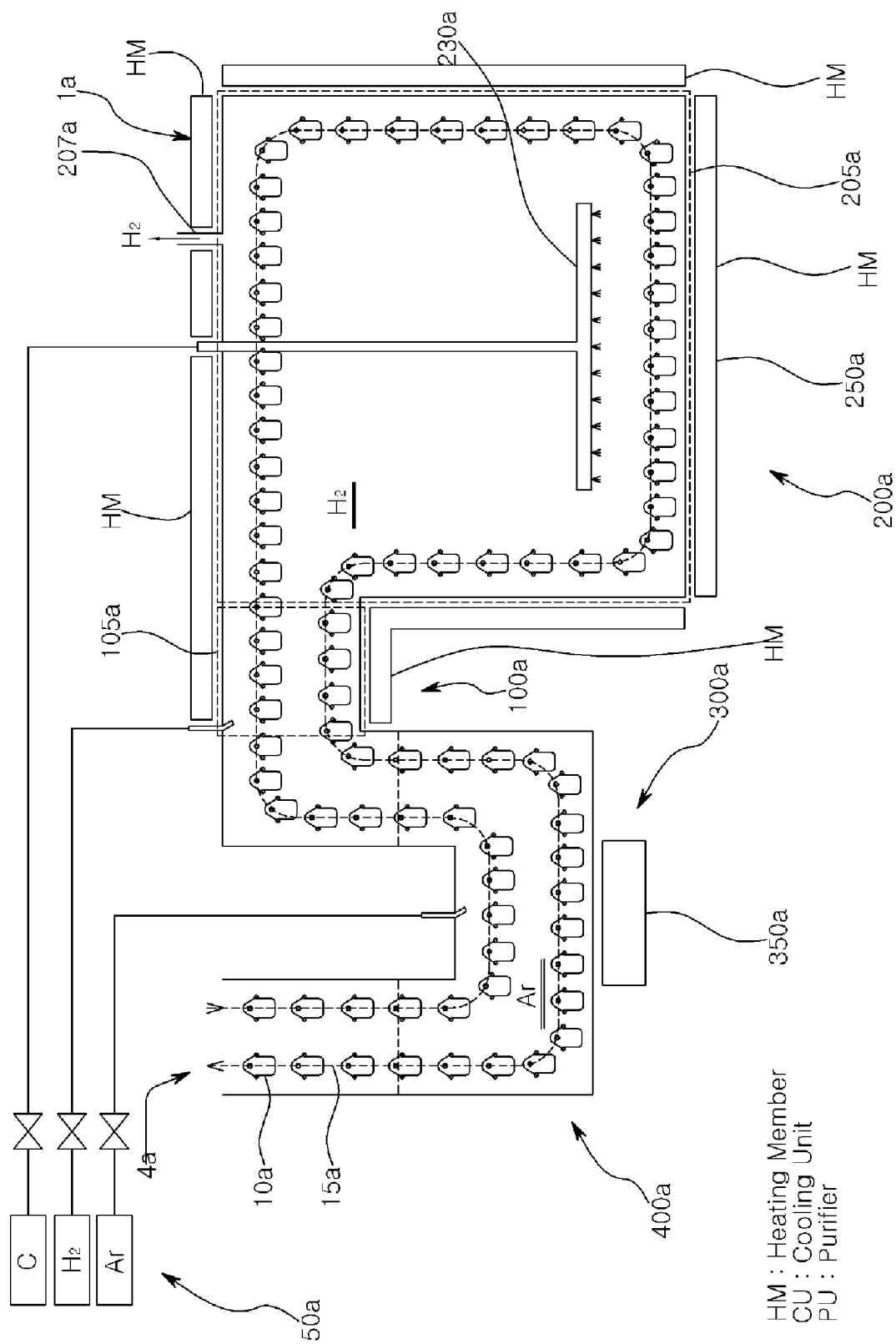
[Fig. 8]

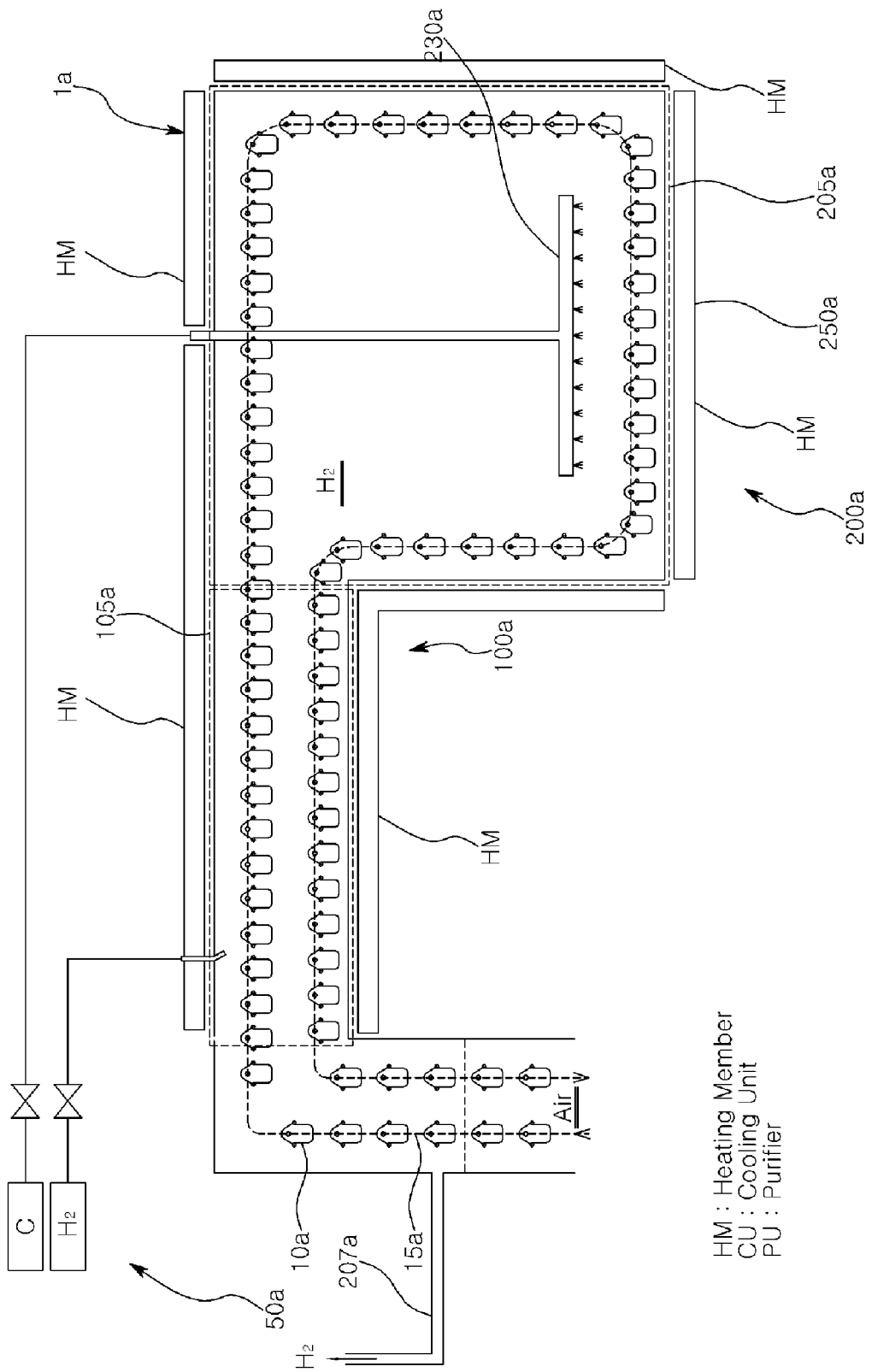
[Fig. 9]

CARBON NANOTUBES MASS FABRICATION SYSTEM AND MASS FABRICATION METHOD

TECHNICAL FIELD

The present invention relates to a mass production system for synthesized carbon nanotubes, and a mass production method thereof using the same. More particularly, the present invention relates to a mass production system for synthesized carbon nanotubes using a vapor synthesis method, and a mass production method thereof using the same.

BACKGROUND ART

The present invention relates to a mass production system for synthesized carbon nanotubes, and a mass production method thereof using the same. More particularly, the present invention relates to a mass production system for synthesized carbon nanotubes using a vapor synthesis method, and a mass production method thereof using the same.

The carbon nanotubes are composed of graphite sheets wound in a cylindrical shape, and can be classified into single-wall carbon nanotubes, double-wall carbon nanotubes, and multi-wall carbon nanotubes according to the number of graphite sheets.

Carbon nanotubes are anticipated to be useful in a wide variety of applications, for example, electronic information industry, energy industry, high performance composite materials, ultra-fine nano components, etc., in view of their light weight, excellent electrical and mechanical properties, chemical stability, and easy surface reaction. Accordingly, it is necessary to provide a method for synthesizing highly pure carbon nanotubes at low costs in mass production.

Currently, representative methods for synthesizing the carbon nanotubes include an arc-discharge method, a laser deposition method, a chemical vapor deposition method, and a vapor synthesis method. For the arc-discharge method or the laser deposition method, since amorphous materials are generated along with the carbon nanotubes when synthesizing the carbon nanotubes, it is necessary to perform a thermal or chemical refinement process in order to obtain highly pure carbon nanotubes, and it is difficult to accomplish economical mass production. For the chemical vapor deposition method, although it is possible to synthesize highly pure carbon nanotubes by aligning them on a substrate, it is also difficult to accomplish their mass production.

Meanwhile, the vapor synthesis method has been spotlighted as a method for synthesizing the carbon nanotubes at low costs. However, although various vapor synthesis methods have been developed, there is a problem in that the carbon nanotubes synthesized by the conventional vapor synthesis methods comprises a high quantity of amorphous carbon particles, making it difficult to refine the carbon nanotubes. Specifically, the vapor synthesis methods are considered inappropriate for mass production of, especially, the single-wall or double-wall carbon nanotubes in terms of their significantly low yield, and high quantity of amorphous carbon particles contained in the synthesized carbon nanotubes.

In addition, the mass production system of the carbon nanotubes employing the vapor synthesis process is a batch type system in which the carbon nanotubes are synthesized by repeating a series of steps of inputting a metal catalyst into a reaction chamber, heating the reaction chamber for a predetermined period of time, and then cooling the reaction chamber for every batch. However, such a mass production system has problems in terms of high manufacturing costs and significantly low productivity due to repetition of the individual steps as described above for every batch, and of low uniformity of the carbon nanotubes due to difficulty of obtaining the same process conditions for every batch.

DISCLOSURE OF INVENTION

Technical Problem

Carbon nanotubes are anticipated to be useful in a wide variety of applications, for example, electronic information industry, energy industry, high performance composite materials, ultra-fine nano components, etc., in view of their light weight, excellent electrical and mechanical properties, chemical stability, and easy surface reaction. Accordingly, it is necessary to provide a method for synthesizing highly pure carbon nanotubes in a large quantity at low costs.

Technical Solution

The present invention has been made to solve the above problems, and it is an object of the present invention to provide a mass production system and method for synthesizing carbon nanotubes via a vapor synthesis process in an open-type reaction chamber.

The present invention relates to a mass production system for synthesized carbon nanotubes, configured to completely open the reaction chamber to an outside while the carbon nanotubes are being synthesized in the reaction chamber, and to block introduction of external air into the reaction chamber via difference in gravities of gases, and a mass production method thereof.

According to the present invention, it is possible to perform a continuous process of continuously inputting a catalyst from the outside into the reaction chamber while allowing the carbon nanotubes synthesized within the reaction chamber to be continuously discharged to the outside, thereby enabling mass production of the carbon nanotubes.

In addition, according to the present invention, the carbon nanotubes having various properties can be synthesized in a large amount by controlling conveying speed of catalyst, reaction temperature, particle size of metal catalyst, injection amount of carbon source gas, and injection amount of hydrogen.

Mass production of high quality carbon nanotubes is possible by continuous process of reduction of catalyst, synthesis of carbon nanotubes and cooling carbon nanotubes.

In accordance with one aspect of the present invention, the above and other objects can be accomplished by the provision of a mass production system for synthesized carbon nanotubes, comprising: a reaction chamber having at least one opening opened to external air, and at least one different-specific gravity gas occupying region filled with a different specific gravity gas having a different specific gravity from that of the external air to block the external air from being introduced into the reaction chamber through the opening; a carbon nanotube synthesizing unit positioned in the different-specific gravity gas occupying region to synthesize the carbon nanotubes by the medium of a catalyst introduced thereto through the opening; a conveying unit to convey the catalyst to the carbon nanotube synthesizing unit through the opening; and gas supply unit to supply the different specific gravity gas and a carbon source gas used for synthesizing the carbon nanotubes to the different-specific gravity gas occupying region and the carbon nanotube synthesizing unit, respectively.

Preferably, the opening comprises an inlet through which the catalyst is introduced into the reaction chamber, and an outlet through which the carbon nanotubes synthesized by the carbon nanotube synthesizing unit are discharged to an outside of the reaction chamber, and the conveying unit conveys the catalyst and/or the carbon nanotubes via the opening, the different-specific gravity gas occupying region, the carbon nanotube synthesizing unit, and the outlet.

Preferably, the carbon nanotube synthesizing unit comprises a reaction region defined in the reaction chamber so as to be blocked from the external air by the different specific gravity gas filled in the different-specific gravity gas occupying region; a carbon source gas injector to inject the carbon source gas supplied from the gas supply unit to the reaction region such that the catalyst conveyed to the reaction region by the conveying unit reacts with the carbon source gas to synthesize the carbon nanotubes; and a heating member to heat the reaction region.

Preferably, the reaction region of the carbon nanotube synthesizing unit is defined at a lower portion of at least one region in the different-specific gravity gas occupying region filled with a different specific gravity gas having a lower specific gravity than the carbon source gas, and the carbon nanotube synthesizing unit further comprises a carbon source gas restriction part opened at an upper portion to block the carbon source gas injected to the reaction region from escaping from the reaction region.

Preferably, the different-specific gravity gas occupying region comprises a first different-specific gravity gas occupying region filled with a different specific gravity gas having a lower specific gravity than the carbon source gas; and a second different-specific gravity gas occupying region filled with a different specific gravity gas having a higher specific gravity than that of the carbon source gas, the first different-specific gravity gas occupying region, the reaction region, and the second different-specific gravity gas occupying region being sequentially defined in a gravity direction within the reaction chamber.

Preferably, the different-specific gravity gas comprises at least one of a gas having a lower specific gravity than that of the external air, and a gas having a higher specific gravity than that of the external air depending on a location of the opening on the reaction chamber in order to block the external air from being introduced into the reaction chamber through the opening.

Preferably, the at least one of the different-specific gravity gases occupying the different-specific gravity gas occupying region is hydrogen gas.

Preferably, the reaction chamber has at least one discharge pipe formed therein to discharge hydrogen gas to the outside of the reaction chamber in order to accomplish an equilibrium state between a pressure of hydrogen gas occupying the different-specific gravity gas occupying region and a pressure of the external air.

Preferably, the different-specific gravity gas occupying region comprises a first occupying region communicated in a direction traversing the direction of gravity, a second occupying region communicated between the inlet and the first occupying region, and a third occupying region communicated between the outlet and the first occupying region, the reaction chamber being bent at the inlet and the outlet thereof so as to define the first occupying region, the second occupying region, and the third occupying region therein.

Preferably, the inlet and the outlet have a positional difference with respect to the first occupying region in the direction of gravity in order to prevent the different-specific gravity gas filled in the different-specific gravity gas occupying region from being discharged to the outside of the reaction chamber through the inlet and the outlet due to gravity.

Preferably, the carbon nanotube synthesizing unit comprises a reaction region defined in the reaction chamber while being blocked from the external air by the different-specific gravity gas filled in the different-specific gravity gas occupying region; a carbon source gas injector to inject the carbon source gas supplied from the gas supply unit to the reaction region such that the catalyst conveyed into the reaction region by the conveying unit reacts with the carbon source gas, thereby synthesizing the carbon nanotubes; and a heating member to heat the reaction region.

Preferably, the different-specific gravity gas comprises a gas having a lower specific gravity than that of the external air, and the inlet and the outlet are located lower than the first occupying region in the direction of gravity in order to prevent the different-specific gravity gas from being discharged to the outside of the reaction chamber through either the inlet or the outlet due to gravity.

Preferably, the different-specific gravity gas is hydrogen gas having the lower specific gravity than that of the external air.

Preferably, the different-specific gravity gas comprises a gas having a higher specific gravity than that of the external air, and the inlet and the outlet are located higher than the first occupying region in the direction of gravity in order to prevent the different-specific gravity gas from being discharged to the outside of the reaction chamber through the inlet and the outlet due to gravity.

Preferably, the carbon source gas injector comprises a plurality of nozzles dispersedly arranged corresponding to a dimension of the reaction region to uniformly inject the carbon source gas into the reaction region.

Preferably, the mass production system further comprises a heating member to heat at least one region inside the reaction chamber to reduce the catalyst introduced into the reaction chamber through the opening.

Preferably, the carbon nanotube synthesizing unit comprises a carbon source restriction part opened upwardly to block the carbon source gas injected into the reaction region from escaping from the reaction region.

Preferably, the mass production system further comprises a cooling unit to cool one region of the reaction chamber near the outlet such that the carbon nanotubes are cooled by the cooling unit.

In accordance with another aspect of the present invention, a mass production method of synthesized carbon nanotubes, comprising the steps of: preparing a reaction chamber having a different-specific gravity occupying region defined therein and at least one opening opened to external air; filling the different-specific gravity occupying region with at least one different-specific gravity gas having a different specific gravity from that of the external air in order to prevent the external air from being introduced into the different-specific gravity occupying region through the opening; supplying a carbon source gas to the different-specific gravity occupying region to form a reaction region blocked from the external air by the different-specific gravity gas; supplying a catalyst into the reaction region of the reaction chamber through the opening; synthesizing the carbon nanotubes by reacting the catalyst with the carbon source gas forming the reaction region; and discharging the synthesized carbon nanotubes to an outside of the reaction chamber through the opening.

Preferably, the different-specific gravity gas occupying region comprises a first occupying region communicated in a direction traversing the gravity direction, a second occupying region communicated between the inlet and the first occupying region, and a third occupying region communicated between the outlet and the first occupying region, the reaction chamber being bent at the inlet and the outlet thereof so as to define the first occupying region, the second occupying region, and the third occupying region therein.

Preferably, the inlet and the outlet have a positional difference with respect to the first occupying region in the direction of gravity in order to prevent the different-specific gravity gas filled in the different-specific gravity gas occupying region from being discharged to the outside of the reaction chamber through the inlet and the outlet due to gravity.

Preferably, the different-specific gravity gas filled in the different-specific gravity gas occupying region comprises hydrogen gas, and the method further comprise: heating the second occupying region; and reducing the catalyst by reacting hydrogen gas with the catalyst in the second occupying region.

Preferably, the reaction chamber further comprises a discharge pipe formed near in at least one of the inlet and the outlet thereof so as to be communicated with the outside, and the method further comprises: discharging hydrogen gas through the discharge pipe to provide an equilibrium state between pressure of hydrogen gas occupying the different-specific gravity gas occupying region and pressure of the external air.

ADVANTAGEOUS EFFECTS

The present invention can be applied to the mass production system for synthesized carbon nanotubes using a vapor synthesis method. In particular, the present invention can be applied to the mass production method of synthesized carbon nanotubes employing the mass production system for synthesized carbon nanotubes, which comprises an open-type reaction chamber.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating a mass production system for synthesized carbon nanotubes using a vapor synthesis method in accordance with a first embodiment of the present invention;

FIG. 2 is a cross-sectional view illustrating an occupying state of gases within a reaction chamber of the mass production system for synthesized carbon nanotubes in accordance with the first embodiment of the present invention;

FIG. 3 is a schematic cross-sectional view illustrating a mass production system for synthesized carbon nanotubes in accordance with a second embodiment of the present invention;

FIG. 4 is a schematic cross-sectional view illustrating a mass production system for synthesized carbon nanotubes in accordance with a third embodiment of the present invention;

FIG. 5 is a schematic cross-sectional view illustrating a mass production system for synthesized carbon nanotubes in accordance with a fourth embodiment of the present invention;

FIG. 6 is a schematic cross-sectional view illustrating a mass production system for synthesized carbon nanotubes in accordance with a fifth embodiment of the present invention;

FIG. 7 is a schematic cross-sectional view illustrating a mass production system for synthesized carbon nanotubes in accordance with a sixth embodiment of the present invention;

FIG. 8 is a schematic cross-sectional view illustrating a mass production system for synthesized carbon nanotubes in accordance with a seventh embodiment of the present invention; and FIG. 9 is a schematic cross-sectional view illustrating a mass production system for synthesized carbon nanotubes in accordance with an eighth embodiment of the present invention.

BEST MODE FOR CARRYING OUT THE INVENTION

Preferred embodiments of the present invention will be described in detail with reference to the accompanying drawings.

Preferred embodiments of the present invention will be described in detail with reference to the accompanying drawings.

FIG. 1 is a schematic cross-sectional view illustrating a mass production system for synthesized carbon nanotubes in accordance with a first embodiment of the present invention. Referring to FIG. 1, the mass production system for synthesized carbon nanotubes according to the first embodiment comprises an arch-shaped reaction chamber 1 having a predetermined space defined therein, a metal catalyst reduction unit 100 to reduce a metal catalyst, a carbon nanotube synthesizing unit 200 to synthesize carbon nanotubes using the reduced metal catalyst, a cooling unit 300 to cool the synthesized carbon nanotubes, a gas supply unit 50 to supply a carbon source gas, an ambient gas, and the like into the reaction chamber, and a conveying unit to convey the metal catalyst into the reaction chamber.

The reaction chamber 1 has an open structure, in which an inlet 2 and an outlet 3 are opened to an outside, and a subsidence part 5 is formed at the center thereof to define a space. The subsidence part 5 serves to collect and preserve the carbon source gas, and can be referred to as a carbon source gas restriction part. The inlet and the outlet can be referred as openings opened to the outside, respectively.

The gas supply unit 50 comprises a carbon source gas tank 60 (for example, ethylene gas tank), an argon gas or a nitrogen gas tank 70 (for example, inert gas tank), and a hydrogen gas tank 80, each of which supplies gas into the reaction chamber via gas supply pipes. Each of the tanks comprises a purifier. The purifiers purify a mixture of carbon gas, a mixture of inert gas and a mixture of hydrogen gas, thereby supplying highly pure carbon source gas, inert gas, and hydrogen gas, respectively. Examples of the carbon source gas include methane, ethane, ethylene, acetylene, propylene, butane, butylenes, butadiene, hexane, heptane, toluene, benzene, xylene, gasoline, propane, liquid propane gas (LPG), liquid natural gas (LNG), naphtha, carbon monoxide, and alcohol-based gas.

The metal catalyst reduction unit 100 serves to reduce a metal oxide catalyst introduced into the reaction chamber 1, or to reduce the metal oxide catalyst from a catalyst bearing material containing the metal oxide catalyst. The metal catalyst reduction unit 100 comprises a first gas nozzle 112 connected into the reaction chamber 1 to supply hydrogen gas, and a first heating member 110 installed at the outside of the reaction chamber 1 to reduce the metal oxide catalyst within a boat 10. The first heating member 110 is a heat generating mechanism to heat the interior of the reaction chamber, and is provided with a temperature sensor (not shown) to maintain the interior of the reaction chamber at a temperature of 600~1, 200° C.

The carbon nanotube synthesizing unit 200 serves to synthesize the carbon nanotubes by allowing the metal oxide catalyst input to the reaction chamber to react with the carbon source gas. The carbon nanotube synthesizing unit 200 comprises a reaction region in which synthesis of the carbon nanotubes is performed, a shower head 212 comprising a plurality of nozzles through which the carbon source gas is uniformly injected, and a second heating member 210 installed at the outside of the reaction chamber 1. Since the plural nozzles are arranged on the shower head 212 such that the carbon source gas is uniformly injected to a predetermined region within the reaction chamber 1, synthesis of the carbon nanotubes is uniformly performed over the whole reaction region within the reaction chamber 1. The second heating member 210 is another heat generating mechanism to heat the interior of the reaction chamber, and is provided with a temperature sensor (not shown) to maintain the interior of the reaction chamber at a temperature of 600~1,200° C.

The cooling unit 300 comprises a cooling member 310 installed in the reaction chamber 1 to cool the interior of the reaction chamber. The reaction chamber 1 is connected with a third gas nozzle 312 to inject inert gas, for example, argon gas, nitrogen gas or hydrogen gas. The cooling member 310 may comprise a water cooling jacket which surrounds the reaction chamber 1. The hydrogen gas supplied through the third gas nozzle 312 serves not only to form the interior of the reaction chamber 1 into a hydrogen gas atmosphere, but also to clean the synthesized carbon nanotubes.

The reaction chamber 1 is formed with a first gas discharge pipe 130 positioned near the inlet 2 of the reaction chamber 1 to discharge remaining gas within the reaction chamber after reaction, and a second gas discharge pipe 330 positioned near the outlet 3 of the reaction chamber 1 to discharge the remaining gas within the reaction chamber after the reaction. This structure is adapted for the purpose of securely preventing external air from permeating into the reaction chamber through the inlet and the outlet by providing an equilibrium state between the pressure of hydrogen gas within the reaction chamber and the pressure of the external air. That is, when hydrogen gas is injected into the reaction chamber through the gas injection pipe, the pressure of hydrogen gas is increased within the reaction chamber, and then, when the pressure of hydrogen gas is increased above the pressure of external air, hydrogen gas is discharged to the outside or the reaction chamber. In this regard, since it is dangerous to discharge hydrogen gas through the inlet and the outlet of the reaction chamber, the separate gas discharge pipes are formed in the reaction chamber in order to discharge hydrogen gas to the outside therethrough.

The conveying unit serves to convey a container which contains the metal catalyst therein, for example, a boat 10, into the reaction chamber, and may be a conveyor and the like. The conveying unit can control a conveying speed of the metal catalyst via motor control or the like, so that a reduction time of the metal oxide catalyst and a synthesis time of the carbon nanotubes can be controlled. The boat 10 is one example of the container which contains the metal catalyst, and may be made of various materials, such as metal, quartz or graphite. The boat 10 has a hole formed through the bottom surface thereof. The hole of the boat promotes reduction of the metal oxide catalyst and synthesis of the carbon nanotubes by enhancing contact between the gas and the metal catalyst during the reduction of the metal oxide catalyst and the synthesis of the carbon nanotubes. In addition, the hole of the boat facilitates discharge of products generated by the reaction.

In the mass production system for the synthesized carbon nanotubes according to the first embodiment as described above, the metal catalyst reduction unit 100, the carbon nanotube synthesizing unit 200, and the cooling unit 300 are sequentially disposed, thereby allowing a continuous process to be performed.

In the mass production system for synthesized carbon nanotubes according to the first embodiment, the boat 10 containing the metal oxide catalyst is supplied into the reaction chamber from the outside, and then discharged to the outside of the reaction chamber through the outlet 3 after passing through the metal catalyst reduction unit 100, the carbon nanotube synthesizing unit 200, and the cooling unit 300 via the conveying unit. When the boat 10 is discharged to the outside through the outlet 3, synthesized carbon nanotubes are taken out from the boat 10. After taking out the synthesized carbon nanotubes from the boat, the boat 10 with a new metal catalyst received therein is conveyed into the reaction chamber via the inlet 2. As such, the conveying unit is configured to circulate between the inlet and the outlet through the reaction chamber. Although the circulation structure of the conveying unit is not illustrated in the drawings, it is apparent to those skilled in the art, and thus detailed description thereof is omitted herein and in the drawings. The mass production system according to the present invention can produce the synthesized carbon nanotubes in a great quantity by repetition of such a continuous process.

Although the heating member is illustrated as being adjacent to the cooling member in FIG. 1, the heating member can be located apart from the cooling member to prevent functional interference therebetween, and alternatively, a heat transfer shielding member may be positioned therebetween to prevent the functional interference. Since these structures are apparent to those skilled in the art, detailed description thereof will be omitted.

FIG. 2 shows an occupying state of a carbon source gas and hydrogen gas within the reaction chamber of the mass production system in accordance with the first embodiment of the present invention. As shown in FIG. 2, the reaction chamber 1 is filled with the carbon source gas and hydrogen gas. As described below, since the external air is prevented from permeating into the reaction chamber 1, the interior of the reaction chamber can be blocked from the external air.

As shown in FIGS. 1 and 2, the carbon source gas is uniformly injected into the reaction chamber 1 through the shower head 212 connected with the gas supply unit, and hydrogen gas is injected thereto through the gas nozzles 112 and 312. In the case where the reaction chamber is supplied with a metal catalyst which has been already reduced, helium, neon, argon, xenon, or nitrogen can be used as an ambient gas in the reaction chamber instead of hydrogen gas.

When assuming that the interior of the reaction chamber 1 has a temperature of about 900° C., and the exterior of the reaction chamber 1 has a temperature of about ° C., weight of each gas can be calculated as follows. Since 1 mole hydrogen gas (22.4 l) has a weight of 2 g at the standard state (0° C.=274 K, 1 atm), and hydrogen gas has a volume increased four times according to Charles' law within the reaction chamber having the temperature of about 900° C. (1174 K), 1 mole hydrogen gas (22.4 l) has a weight of about 0.5 g therein. Meanwhile, since 1 mole air (22.4 l) has a weight of 28.9 g at the standard state, 1 mole hydrogen gas (22.4 l) has a weight of about 27 g at room temperature (20° C.).

Thus, since external air has the specific gravity about 54 times that of hydrogen gas at the inlet and the outlet of the reaction chamber where the external air contacts hydrogen gas, the air is always located under hydrogen gas due to difference in specific gravity. Since the interior of the reaction chamber is occupied with hydrogen gas, and an equilibrium state between hydrogen gas and the external air is obtained at the inlet and the outlet of the reaction chamber, the external air is prevented from permeating into the reaction chamber. Since an occupation region of hydrogen gas within the reaction chamber is occupied with a gas having a different specific gravity from that of the external air, it can be referred to as a different-specific gravity gas occupying region. Such a hydrogen gas occupying region prevents the external air from being introduced into the reaction chamber. Here, when a region occupied with hydrogen gas at the inlet of the reaction chamber is referred to as an inlet side-occupation region, a region occupied with hydrogen gas at the outlet of the reaction chamber is referred to as an outlet side-occupation region, and a region occupied with hydrogen gas between the inlet and the outlet of the reaction chamber is referred to as an intermediate-occupation region, the inlet and the outlet is located below the intermediate-occupation region in the direction of gravity in order to prevent the external air from being introduced into the reaction chamber therethrough. The intermediate-occupation region is formed in a direction traversing the direction of gravity. The inlet side-occupation region is located between the inlet of the reaction chamber and the intermediate-occupation region, and the outlet side-occupation region is located between the outlet of the reaction chamber and the intermediate-occupation region.

The subsidence part 5 of the reaction chamber has a deep space formed by depressing a portion of the reaction chamber deeper than a portion surrounding the subsidence part 5. Thus, since the carbon source gas injected directly from above the subsidence part 5 through the shower head has a higher specific gravity than that of hydrogen gas therearound, it sinks, and is then collected in the subsidence part 5. Since the carbon source gas collected in the subsidence part 5 is heavier than hydrogen gas, it cannot rise above, and escape from the subsidence part 5. An occupation region of the carbon source gas in the subsidence part is surrounded by the occupation region of hydrogen gas within the reaction chamber. The occupation region of the carbon source gas becomes a reaction region where the hydrogen gas reacts with the metal catalyst, synthesizing the carbon nanotubes, and the reaction region is blocked from the external air outside the reaction chamber by hydrogen gas.

A portion of hydrogen gas introduced into the reaction chamber is discharged to the outside of the reaction chamber through the gas discharge pipes 130 and 330 near the inlet 2 and the outlet 3 of the reaction chamber. This structure is for the purpose of securely preventing the external air from permeating into the reaction chamber by maintaining the equilibrium state between pressures of hydrogen gas and the external air. While hydrogen gas is discharged through the gas discharge pipes, a flow of hydrogen gas is created towards the gas discharge pipes. Since the gas discharge pipes 130 and 330 are located near the inlet 2 and the outlet 3 of the reaction chamber, hydrogen gas is continuously supplied towards the inlet and the outlet of the reaction chamber, thereby maintaining the pressure of hydrogen gas at such a degree that permeation of the external air into the reaction chamber is not permitted.

A method for synthesizing carbon nanotubes using the system of the synthesized carbon nanotubes according to the first embodiment will be described as follows.

The metal catalyst reduction unit 100 and the carbon nanotube synthesizing unit 200 of the reaction chamber 1 are heated to a desired temperature, for example, to a temperature of 600~1,200° C. by the first heating member 110 and the second heating member 210 (Step 1).

Then, inert gas, for example, argon gas or nitrogen gas, is supplied into the reaction chamber by the gas supply unit 50 (Step 2). As the inert gas having a higher specific gravity is supplied into the reaction chamber, air or other gases having a lower specific gravity are pushed out and/or swept away through the inlet and outlet of the reaction chamber by the inert gas. As a result, the impurity gases are removed from the reaction chamber 1, and the interior of the reaction chamber becomes an inert gas atmosphere. Although operation of filling the interior of the reaction chamber with the inert gas can be performed after heating the interior of the reaction chamber as described above, it is possible to fill the interior of the reaction chamber with the inert gas before heating the interior of the reaction chamber.

Next, hydrogen gas is supplied into the reaction chamber 1 of the inert gas atmosphere via the gas supply unit 50 (Step 3). Since hydrogen gas is lighter than argon gas filled in the reaction chamber, hydrogen gas is filled in the reaction chamber from an upper portion of the reaction chamber.

Then, a metal oxide catalyst having a size of 1 to 50 □, or a boat 10 receiving a catalyst bearing material which comprises the metal oxide catalyst is supplied from the outside into the reaction chamber through the inlet 2 by the conveying unit 15 (Step 4). The catalyst bearing material may have a powder shape, and comprise magnesium oxide (MgO), alumina ($Al_2O_3$), zeolite, silica or the like. As a method for bearing the metal oxide catalyst into nano-size pores of the catalyst bearing material, a sol-gel method, a precipitation method or an impregnation method may be used.

The metal oxide catalyst conveyed into the reaction chamber is reduced to a pure metal catalyst that does not contain oxygen by the metal catalyst reduction unit 100 (Step 5). For example, if the metal oxide catalyst is an iron oxide, the iron oxide reacts with hydrogen gas, and is converted into pure iron and water. Such a metal oxide catalyst includes Co, Ni, Mo or alloys thereof as well as iron.

After passing through the metal catalyst reduction unit 100, the boat 10 is conveyed to the carbon nanotube synthesizing unit 200. The metal catalyst reacts with a carbon source gas in reaction region in the carbon nanotube synthesizing unit 200, thereby synthesizing carbon nanotubes (Step 6).

Synthesis of the carbon nanotube is performed in the hydrogen gas atmosphere in which hydrogen gas removes the metal oxide formed on the surface of the metal catalysis particles, and suppresses excessive supply of carbon elements to the surface of the metal catalysis. In addition, hydrogen gas removes an amorphous carbon material adsorbed to the surface of the metal catalysis particles, and suppresses amorphous carbon clusters or carbon powder from being attached to an outer surface of the carbon nanotubes growing in the reaction chamber. Of course, it is possible to adjust growth speed, diameter and crystallinity of the carbon nanotubes by controlling flux of the carbon source gas and the temperature of the reaction region upon synthesis of the carbon nanotubes.

In particular, when the metal catalyst particles are born and secured to the nano-sized pores of the powdery catalyst bearing material, the metal catalyst particles are suppressed from moving even at high temperatures required for synthesizing the carbon nanotubes, thereby enabling synthesis of carbon nanotubes which have a very uniform diameter. In addition, when the carbon nanotubes are synthesized with the metal catalyst particles, having a size of several nano meters, born and secured to the nano-sized pores of the powdery matrix, it is possible to synthesize highly pure carbon nanotubes since the amorphous carbon clusters are not formed.

The boat 10 having the synthesized carbon nanotubes therein is conveyed to the cooling unit 300, and is forcibly cooled by the cooling member 310 (Step 7). The synthesized highly pure carbon nanotubes are cooled to room temperature while passing through the cooling unit 300, and repetitiously cleaned in the hydrogen gas atmosphere.

Finally, the synthesized carbon nanotubes are discharged to the outside of the reaction chamber through the outlet 3 (Step 8). After the synthesized carbon nanotubes are taken from the boat 10 conveyed to the outside of the reaction chamber, the boat 10 with a new metal catalyst received therein is conveyed into the reaction chamber via the inlet 2, allowing continuous synthesis of the carbon nanotubes to be performed. With such a continuous process, the carbon nanotubes can be produced in a great quantity. A process of cooling the synthesized carbon nanotubes can be independently performed at the outside after being discharged from the reaction chamber. In this case, the reaction chamber may not comprise the cooling member.

In order to synthesize the carbon nanotubes with such a continuous process, it is necessary to securely prevent air from permeating into the reaction chamber. If oxygen is introduced into the reaction chamber via permeation of the air, oxygen reacts with the carbon source gas in an instant, thereby failing to synthesize the carbon nanotubes, and possibly reacts with hydrogen gas, causing explosion. Thus, it is necessary for the reaction chamber to have no oxygen therein.

In order to form an oxygen-free interior of the reaction chamber, a conventional batch type mass production system of carbon nanotubes through the vapor synthesizing method adopts a batch type structure in which the interior of the reaction chamber is completely blocked from the outside, and is filled with inert gas.

With this structure as described above, however, it is necessary to repeat the steps of heating the reaction chamber to synthesize the carbon nanotubes, and then cooling the reaction chamber at every process of synthesizing the carbon nanotubes. Thus, the conventional batch type mass production system requires an excessive preparation time before the synthesis of the carbon nanotubes in addition to a period of time for the synthesis of the carbon nanotubes, thereby limiting an increase of productivity.

On the contrary, according to the present invention, since the reaction chamber is opened to the outside, it is possible to keep the interior of the reaction chamber at a temperature enabling synthesis of the carbon nanotubes, and thus it is not necessary to repetitiously cool and heat the interior of the reaction chamber. Accordingly, with the mass production system for synthesized carbon nanotubes according to the invention, the carbon nanotubes can be continuously synthesized without being stopped even for an instant once the system is operated. Such continuous synthesis of the carbon nanotubes can be achieved due to the structure as described hereinafter. Since the interior of the reaction chamber is opened to the outside, it is possible to continuously supply the metal catalysis into the reaction chamber. In addition, since the carbon nanotubes are synthesized continuously in the carbon nanotube synthesizing unit 200 even at a moment when the metal catalyst is continuously introduced into the reaction chamber, the carbon nanotubes can be synthesized in a great quantity. To this end, the reaction chamber must be the open structure in which the inlet and the outlet are opened while preventing the external air from permeating into the reaction chamber therethrough. The external air is prevented from permeating into the reaction chamber by allowing gases having different specific gravities to occupy specific regions of the reaction chamber. An occupation region of a gas having a different specific gravity from other gases within the reaction region is referred to as a different-specific gravity occupying region.

In addition, since the pressure of the different-specific gravity gas positioned in the reaction chamber is in the equilibrium state with respect to the pressure of the external air at the inlet and the outlet of the reaction chamber, the external air is prevented from permeating into the reaction chamber.

FIG. 3 is a schematic cross-sectional view illustrating a mass production system for synthesized carbon nanotubes in accordance with a second embodiment of the present invention. As shown in FIG. 3, the mass production system for synthesized carbon nanotubes according to the second embodiment has a V-shaped structure, in which an inlet 2 and an outlet 3 are opened upwardly, and a carbon nanotube synthesizing unit 200 is formed in a subsidence part 5 depressed at the center of the reaction chamber. In the mass production system for synthesized carbon nanotubes according to the second embodiment, argon gas having a molecular weight of 39.948 is used as an ambient gas of the reaction chamber, and toluene having a molecular weight of 92.1 greater than that of argon gas is used as a carbon source gas.

As in the first embodiment of the present invention, the mass production system of the second embodiment comprises a metal catalyst reduction unit 100, a gas supply unit, a carbon nanotube synthesizing unit 200, and a cooling unit 300. However, in order to prevent repetitious description thereof, some components are not illustrated in the drawings, and detailed description thereof is omitted in the following description.

The mass production system according to the second embodiment will be described hereinafter in terms of a different structure from that of the first embodiment.

In the mass production system according to the second embodiment, the reaction chamber has an open structure in which the inlet 2 and the outlet 3 are opened upwardly, and an A-shaped part 150 is formed near the inlet 2 in such a manner of being slanted upwardly and then downwardly. The metal catalyst reduction unit 100 is formed in the A-shaped part 150.

The A-shaped part 150 is supplied with hydrogen gas through a gas supply pipe. Since hydrogen gas has a lower specific gravity that that of external air or that of argon gas in the reaction chamber, hydrogen gas is filled in the A-shaped part 150 from an upper portion thereof. Thus, hydrogen gas is injected such that a central portion of the A-shaped part 150 is completely filled with hydrogen gas. In this case, since air at the inlet 2 of the reaction chamber has a greater specific gravity than hydrogen gas filled in the A-shaped part 150, and is always located under hydrogen gas, it cannot be introduced into the reaction chamber. The metal catalyst reduction unit 100 is formed in the A-shaped part 150, and serves to reduce a metal oxide catalyst. Since hydrogen gas decreases in amount due to reduction of the metal oxide catalyst within the reaction chamber, it is necessary to supply hydrogen gas into the reaction chamber. The A-shaped part 150 is provided with a discharge pipe through which a portion of hydrogen gas supplied into the reaction chamber is discharged to the outside.

An inner portion of the reaction chamber 1 connected with the A-shaped part 150 is filled with argon gas. Since argon gas has a greater specific gravity than that of the external air and than that of hydrogen gas, argon gas is filled in the reaction chamber from a lower portion thereof. Here, if an injected amount of argon gas exceeds a pre-determined limit, argon gas pushes hydrogen gas from the A-shaped part 150, and is then filled therein. Thus, it is necessary to adjust the injection amount of argon gas so as not to exceed a slanted portion corresponding to a reduction region of the A-shaped part 150.

At this time, although the external air contacts argon gas at the outlet 3 of the reaction chamber, it cannot permeate into the reaction chamber, since it has a lower specific gravity than that of argon gas, and thus locates above argon gas.

In the carbon nanotube synthesizing unit 200, toluene having a greater specific gravity than that of argon gas is used as a carbon source gas in order to synthesize carbon nanotubes. In the mass production system according to the second embodiment, the reaction chamber is formed with a subsidence part 5 depressed in the gravity direction. In this regard, in order to allow the carbon source gas to sink and effectively collect in the subsidence part 5, a gas having a greater specific gravity than that of a surrounding gas is used as the carbon source gas. Thus, as toluene gas collected in the subsidence part 5 of the reaction chamber reacts with the metal catalyst, the carbon nanotubes are efficiently synthesized. The subsidence part 5 of the reaction chamber serves to restrict the carbon source gas.

It should be noted that the ambient gas supplied into a reaction region is not limited to argon gas, and may comprise any of inert gases having a greater specific gravity than that of the external air. In addition, the carbon source gas is not limited to toluene gas, and may comprise other gases having a greater specific gravity than that of the ambient gas.

The mass production system according to this embodiment comprises the A-shaped part 150 in order to perform the catalyst reduction within the reaction chamber 1. However, when the reaction chamber is supplied with a catalyst which has been already reduced, there is no need to reduce the catalyst within the reaction chamber, and thus there is no need to form the A-shaped part.

FIG. 4 is a schematic cross-sectional view illustrating a mass production system for synthesized carbon nanotubes in accordance with a third embodiment of the present invention. As shown in FIG. 4, the mass production system for the synthesized carbon nanotubes according to the third embodiment is similar to that of the second embodiment, excluding the structure of the reaction chamber in which a carbon source gas restriction part 250 is formed at an upper portion of the reaction chamber by modifying the subsidence part which serves to restrict the carbon source gas.

As in the first embodiment, the mass production system of the third embodiment comprises a gas supply unit, a carbon nanotube synthesizing unit 200, and a cooling unit 300, excluding the metal catalyst reduction unit. Since the mass production system according to the third embodiment employs a metal catalyst which has been already reduced, it is possible to omit the metal catalyst reduction unit.

The mass production system according to the third embodiment is designed for the case where a carbon source gas is one having a lower specific gravity than that of the ambient gas supplied to a reaction region within the reaction chamber. In this embodiment, argon gas is used as the ambient gas of the reaction chamber, and et hylene or the like having a lower specific gravity than that of argon gas is used as the carbon source gas. However, other gases having a difference in specific gravity therebetween as described above can be used as for the ambient gas and the carbon source gas, respectively. The carbon source gas restriction part 250 has a circumference blocked by walls and an upper portion blocked by a ceiling surface of the reaction chamber, and is thus opened only in a downward direction. The mass production system of the third embodiment comprises a shower head which has nozzles facing upwardly to inject the carbon source gas upwardly. As a result, the carbon source gas of the lower specific gravity rises, and is collected in the carbon source gas restriction part 250.

Thus, the carbon source gas collected in the carbon source gas restriction part 250 reacts with the metal catalyst supplied to the carbon source gas restriction part 250, thereby synthesizing the carbon nanotubes.

FIG. 5 is a schematic cross-sectional view illustrating a mass production system for synthesized carbon nanotubes in accordance with a forth embodiment of the present invention. As shown in FIG. 5, the mass production system for the synthesized carbon nanotubes according to the forth embodiment is similar to that of the first embodiment, excluding U-shaped parts 400 formed at both sides of the reaction chamber, and an inlet 2 and an outlet 3 connected with the U-shaped parts 400 while being opened upwardly.

As in the first embodiment, the mass production system of the forth embodiment comprises a metal catalyst reduction unit 100, a gas supply unit (not shown), a carbon nanotube synthesizing unit 200, and a cooling unit 300, which are not shown in the drawing for clear illustration of the system.

In order to block the external air, each U-shaped part 400 of the reaction chamber is adopted to allow argon gas having the greater specific gravity than that of the external air to remain therein. The U-shaped parts 400 of the reaction chamber are connected with injection pipes through which argon gas is injected thereto. The reaction chamber has the metal catalyst reduction unit 100 and the carbon nanotube synthesizing unit 200 after the U-shaped part 400 of the inlet 2. Meanwhile, the reaction chamber is filled with hydrogen gas in the metal catalyst reduction unit 100 and in the carbon nanotube synthesizing unit 200, and filled with argon gas in the U-shaped part 400 of the outlet 3. Thus, the external air contacts argon gas at the inlet 2 and the outlet 3 of the reaction chamber. Since the external air has the lower specific gravity than that of argon gas, it is located above argon gas, and thus cannot permeate into the reaction chamber.

It should be noted that not only argon gas but also other inert gases having a greater specific gravity than that of the external air can be used as the gas injected into the U-shaped parts 400. In addition, it is possible to inject not only the same gas but also different gases into the U-shaped parts 400, respectively.

In the carbon nanotube synthesizing unit 200 of the reaction chamber, ethylene or the like (as a carbon source gas) having a greater specific gravity than that of hydrogen gas is injected through a shower head, collected in a subsidence part 5 depressed downwardly, and reacts with a metal catalyst while passing through the subsidence part 5, thereby synthesizing the carbon nanotubes.

For the mass production systems according to the above embodiments, if the carbon nanotube synthesizing unit or the reaction region is increased in length, a distance of a catalyst containing member to be conveyed while allowing the catalyst to react with the gases therein is also increased, thereby permitting an increase in conveying speed of the catalyst containing member. In other words, for the case where a reaction time and an inner temperature of the reaction chamber for synthesis are determined, if the carbon nanotube synthesizing unit is formed to a long length, it is possible to increase an input speed of the metal catalyst into the reaction chamber, which results in an increase of productivity.

In the mass production systems of the above embodiments, although the heating members are described as being installed at the outside of the reaction chamber, the present invention is not limited to this structure. Alternatively, the heating members may be integrally formed with the metal catalyst reduction unit and the carbon nanotube synthesizing unit. As such, the present invention comprises all the cases described above.

The different-specific gravity gas occupying region indicates a predetermined space of the reaction chamber continuously occupied with a gas having a different specific gravity from that of other surrounding gases such as external air by a difference in specific gravity therebetween.

The mass production system of the present invention having a plurality of bent parts formed therein may comprise one or more different-specific gravity gas occupying parts from the inlet 2 to the outlet 3 of the reaction chamber.

If two or more different-specific gravity gas occupying parts are formed in the reaction chamber, the different-specific gravity gas occupying parts may be occupied with different gases, respectively.

A mechanism for conveying the catalyst containing member may be not only an automatic conveying mechanism including the conveyor, but also manual conveying mechanism.

Since the subsidence part 5 or the carbon source gas restriction part 250 formed in the reaction chamber serves to concentrate the carbon source gas in a particular location, the subsidence part 5 or the carbon source gas restriction part 250 can enhance efficiency of synthesizing the carbon nanotubes.

FIG. 6 is a schematic cross-sectional view illustrating a mass production system for synthesized carbon nanotubes in accordance with a fifth embodiment of the present invention. Referring to FIG. 6, the mass production system for synthesized carbon nanotubes according to the fifth embodiment comprises a reaction chamber 1a having a predetermined space defined therein. The reaction chamber 1a has an inlet 2a, and an outlet 3a formed at one side thereof. Both inlet 2a and outlet 3a of the reaction chamber have an open type structure which is opened to atmosphere. The system further comprises a conveying unit 15a which conveys a bucket 10a, that is, a catalyst containing member which contains a metal catalyst, from the inlet 2a to the outlet 3a via the interior of the reaction chamber 1a.

The reaction chamber 1a has an upright structure. The reaction chamber 1a comprises the inlet 2a opened downwardly at one side, a metal catalyst reduction unit 100a extending upwardly from the inlet 2a of the reaction chamber, a carbon nanotube synthesizing unit 200a connected with the metal catalyst reduction unit 100a and extending downwardly therefrom, a cooling unit 300a connected with the carbon nanotube synthesizing unit 200a at a lower portion of the reaction chamber 1a, and the outlet 3a connected with the cooling unit 300a and opened upwardly. The metal catalyst reduction unit 100a, the carbon nanotube synthesizing unit 200a and/or the cooling unit 300a are connected with a gas supply unit 50a, which supplies carbon source gas, hydrogen gas, argon gas (or other inert gas such as nitrogen gas) and the like into the reaction chamber. The reaction chamber has the structure wherein the inlet 2a, the metal catalyst reduction unit 100a, the carbon nanotube synthesizing unit 200a, the cooling unit 300a, and the outlet 3a are sequentially connected with each other.

The metal catalyst reduction unit 100a serves to remove oxygen from a metal oxide catalyst introduced into the reaction chamber 1a by reducing the metal oxide catalyst. The metal catalyst reduction unit 100a comprises an upper reaction chamber 110a having a space defined therein, and a first heating member 150a provided on the upper reaction chamber 110a. The metal catalyst reduction unit 100a is provided with a hydrogen gas discharge pipe 120a at one side above the inlet 2a of the reaction chamber such that the hydrogen gas discharge pipe 120a is exposed to external air. The upper reaction chamber 110a is closed at an upper side to confine a gas rising within the reaction chamber. The first heating member 150a is a heat generating mechanism to heat the interior of the reaction chamber, and is provided with a temperature sensor (not shown) to maintain the interior of the reaction chamber at a temperature of 600~1,200° C. The upper reaction chamber 110a of the metal catalyst reduction unit 100a is occupied with hydrogen gas supplied into the reaction chamber. An occupation region of the upper reaction chamber 110a occupied with hydrogen gas having the lowest specific gravity among several gases in the reaction chamber will be referred to as a hydrogen gas occupation region. The metal oxide catalyst is provided in the form of catalyst carrier which contains the metal oxide catalyst.

In the carbon nanotube synthesizing unit 200a, the metal catalyst reacts with the carbon source gas, synthesizing the carbon nanotubes. The carbon nanotube synthesizing unit 200a comprises a central reaction chamber 210a having an upright space to allow a gas having a lower specific gravity to rise therein, and a second heating member 250a installed to the central reaction chamber 210a. Since the central reaction chamber 210a is provided with a reaction region where the metal catalyst reacts with the carbon source gas, thereby allowing synthesis of the carbon nanotubes, the central reaction chamber 210a has an enough length to allow the metal catalyst to pass therethrough for a sufficient period of time, and has an inner diameter greater than the upper reaction chamber 110a or a lower reaction chamber 310a described below in order to ensure that a sufficient amount of carbon source gas exists therein. The second heating member 250a is also a heat generating mechanism to heat the interior of the reaction chamber, and is provided with another temperature sensor (not shown) to maintain the interior of the reaction chamber at a temperature of 600~1,200° C. The central reaction chamber 210a constituting the carbon nanotube synthesizing unit 200a is occupied with the carbon source gas, for example, ethylene gas, having a higher specific gravity than that of hydrogen gas. An occupation region of the central reaction chamber 210a occupied with ethylene gas having the higher specific gravity than hydrogen gas among several gases in the reaction chamber will be referred to as an ethylene gas occupation region. The central reaction chamber 210a has been described as an exemplary structure which allows the gases to ascend or descend according to difference in specific gravities thereof. Thus, it should be noted that the central reaction chamber 210a is not limited to a slope shown in FIG. 6, and may comprise any structure which has a suitable slope formed therein as long as it enables the gases to ascend or descend according to difference in specific gravities thereof.

The cooling unit 300a serves to cool the synthesized carbon nanotubes. The cooling unit 300a comprises a lower reaction chamber 310a connected with the carbon nanotube synthesizing unit 200a and having a closed bottom surface to allow a gas, for example, argon gas, heavier than the carbon source gas to remain thereon, and a cooling member 350a provided to the lower reaction chamber 310a. The lower reaction chamber 310a constituting the cooling unit 300a is filled with argon gas which is one of inert gases having heavier specific gravities than that of ethylene gas, and an occupation region of the lower reaction chamber 310a occupied with argon gas will be referred to as an argon gas occupation region. As described above, since in gravity direction the hydrogen gas occupation region of the upper reaction chamber and the argon gas occupation region of the lower reaction chamber 310a are occupied with the gases having different specific gravities within the reaction chamber, both regions will be referred to as different-specific gravity gas occupation parts.

In this embodiment, the cooling member 350a is constituted by a water cooling jacket. However, it should be noted that various cooling members 350a may be used as long as they can perform a cooling function. The lower reaction chamber 310a is formed at an inside bottom with a U-shaped discharge pipe 20a which discharges by-products including water. Since the U-shaped discharge pipe 20a has water pooling in a bent structure of the U shape, the gas cannot escape from the lower reaction chamber 310a. The cooling unit 300a decreases the temperature of argon gas so that the specific gravity of argon gas is prevented from being lowered due to thermal expansion.

The gas supply unit 50a comprises a carbon source gas tank, an argon gas or nitrogen gas tank, and a hydrogen gas tank, each of which is connected with the reaction chamber via a gas injection pipe having an opening/closing valve. Each of the tanks comprises a purifier. The purifiers purify a mixture of carbon gas and a mixture of hydrogen gas, and supply highly pure carbon source gas and hydrogen gas. Examples of the carbon source gas include methane, ethane, ethylene, acetylene, propylene, butane, butylenes, butadiene, hexane, heptane, toluene, benzene, xylene, gasoline, propane, liquid propane gas (LPG), liquid natural gas (LNG), naphtha, carbon monoxide, and alcohol-based gas. The inert gas is contained in the lower reaction chamber 310a. The present invention may use any one of the inert gases heavier than the carbon source gas without being limited to argon or nitrogen. Among the gases supplied into the reaction chamber through the injection pipe of the gas supply unit 50a connected with the cooling unit 300a, the carbon source gas moves upwards, and is positioned in the carbon nanotube synthesizing unit 200a, while hydrogen gas moves upwards, passes the carbon nanotube synthesizing unit 200a, and is then positioned in the metal catalyst reduction unit 100a. Here, since hydrogen gas collides with, and causes the carbon source gas filled in the carbon nanotube synthesizing unit 200a to move while rising and passing through the carbon nanotube synthesizing unit 200a, the moving carbon source gas is actively brought into contact with the metal catalyst, thereby enabling more active synthesis of the carbon nanotubes.

The conveying unit 15a serves to convey the catalyst containing member from the inlet 2a to the outlet 3a of the reaction chamber, and is configured to circulate within the reaction chamber. The conveying unit 15a can control a conveying speed of the catalyst containing member via motor control or the like so that a reduction time of the metal oxide catalyst and a synthesis time of the carbon nanotubes can be freely controlled. The catalyst containing member according to the embodiment is a bucket to supply the metal catalyst required for synthesis of the carbon nanotubes via a vapor synthesizing method to the reaction chamber. The bucket is hingably connected at an upper end with a conveyer system. Accordingly, the bucket is maintained in an upright state at any locations by hinge coupling so that the metal catalyst contained in catalyst containing member is not poured out of the catalyst containing member. The catalyst containing member is not limited to the bucket, and can be realized in various forms appropriate for conveying the metal catalyst. The catalyst containing member may be made of various materials, such as metal, quartz, graphite, and the like. The catalyst containing member may have an aperture formed at a bottom surface thereof to enable active reaction of the metal catalyst with the carbon source gas.

In each drawing, dotted lines dividing respective regions in upper and lower directions schematically indicate regions occupied by different gases.

Although the mass production system of this embodiment has been described as employing the bucket as for the catalyst containing member which contains the metal catalyst, the present invention is not limited to this structure. For example, the mass production system of the invention may employ various members, such as a boat or a tray, which can contain the metal catalyst. In this case, it is possible to select a suitable conveying system according to the kinds of catalyst containing member. This is apparent to the skilled in the art, and thus detailed description will be omitted hereinafter.

A method for synthesizing carbon nanotubes using the system of the synthesized carbon nanotubes according to the fifth embodiment will be described as follows.

The metal catalyst reduction unit 100a and the carbon nanotube synthesizing unit 200a of the reaction chamber 1a are heated to a desired temperature, for example, to a temperature of 600~1,200° C. by the first heating member 110a and the second heating member 210a (Step 1).

Then, an inert gas, for example, argon gas or nitrogen gas, is supplied into the reaction chamber through an inert gas injection pipe connected with the upper reaction chamber 110a (Step 2). Specifically, when argon gas is supplied into the reaction chamber through the gas injection pipe connected with the upper reaction chamber 110a, argon gas having a higher specific gravity than external air causes air existing in the interior of the reaction chamber to be discharged to the outside of the reaction chamber via the inlet 2a and the outlet 3a while moving to a left or right side of the upper reaction chamber 110a. In this manner, air or oxygen is completely discharged from the reaction chamber 1a, so that an inert gas atmosphere is formed in the reaction chamber 1a.

Next, hydrogen gas and carbon source gas are supplied to the reaction chamber 1a via the gas supply unit 50a (Step 3).

Then, a metal oxide catalyst, or the bucket 10a receiving a catalyst bearing material which comprises the metal oxide catalyst is supplied from the outside into the reaction chamber through the inlet 2a (Step 4). The bucket 10a is conveyed by the conveying unit 15a.

The catalyst bearing material may have a powder shape, and comprise magnesium oxide (MgO), alumina ($Al_2O_3$), zeolite, silica or the like. As a method for bearing the metal oxide catalyst into nano-size pores of the catalyst bearing material, a sol-gel method, a precipitation method or an impregnation method may be used.

The metal oxide catalyst of the bucket 10a conveyed into the reaction chamber is reduced to a metal catalyst by the metal catalyst reduction unit 100a (Step 5). For example, if the metal oxide catalyst is an iron oxide, the iron oxide reacts with hydrogen gas, and is converted into pure iron and water. Such a metal oxide catalyst includes Co, Ni, Mo or alloys thereof as well as iron.

After passing through the metal catalyst reduction unit 100a, the metal catalyst of the bucket 10a is conveyed to the carbon nanotube synthesizing unit 200a. The metal catalyst reacts with a carbon source gas in the carbon nanotube synthesizing unit 200a, synthesizing carbon nanotubes (Step 6).

Of course, when synthesizing the carbon nanotubes, it is possible to regulate growth speed, diameter, crystallinity of carbon nanotubes by controlling an injection amount of the carbon source gas, and the temperature of the carbon nanotube synthesizing unit 200a.

In particular, the metal catalyst particles are born and secured to the nano-sized pores of the powdery catalyst bearing material so that the metal catalyst particles are suppressed from moving even at high temperatures required for synthesizing the carbon nanotubes, thereby enabling synthesis of carbon nanotubes having a uniform diameter. In addition, since the carbon nanotubes are synthesized with the metal catalyst particles, having a size of several nano meters, born and secured to the nano-sized pores of the powdery matrix, the synthesized carbon nanotubes are highly pure without amorphous carbon clusters formed therein.

The bucket 10a carrying the synthesized carbon nanotubes is conveyed to the cooling unit 300a, and is forcibly cooled to room temperature by the cooling member 350a (Step 7). Alternatively, the carbon nanotubes may be discharged to the outside of the reaction chamber, and then cooled at the outside without performing such a cooling process.

After being cooled, the synthesized carbon nanotubes are discharged to the outside of the reaction chamber through the outlet 3a (Step 8). After the carbon nanotubes are taken from the bucket 10a, the bucket 10a with a new metal catalyst received therein is conveyed into the reaction chamber via the inlet 2a. In this manner, since synthesis of the carbon nanotubes is continuously repeated via reaction between a metal catalyst newly carried by the bucket and the carbon source gas while the bucket is conveyed into and from the reaction chamber, it is possible to produce the synthesis carbon nanotubes in a great quantity. Operation to withdraw the synthesized carbon nanotubes from the bucket, and then input a new metal catalyst thereto can be performed by typical automation equipment known in the art.

As such, since the mass production system for synthesized carbon nanotubes according to the preferred embodiment comprises the metal catalyst reduction unit 100a, the carbon nanotube synthesizing unit 200a and the cooling unit 300a successively arranged, and has the open structure opened to the external air, it is possible to synthesize the carbon nanotubes continuously. In other words, the present invention accomplishes synthesis of the carbon nanotubes via a continuous process which enables continuous input of the metal catalyst into the reaction chamber and continuous discharge of the synthesized carbon nanotubes from the reaction chamber to the outside.

Since the carbon source gas, hydrogen gas, and argon gas supplied to the reaction chamber through the gas injection pipes have different specific gravities, hydrogen gas having the lowest specific gravity is filled in the upper reaction chamber 110a of the metal catalyst reduction unit 100a, ethylene gas having a higher specific gravity than hydrogen gas is filled in the central reaction chamber 210a of the carbon nanotube synthesizing unit 200a, and argon gas having the highest specific gravity is filled in the lower reaction chamber 310a which is the lowest part of the reaction chamber. During this process, since some gas injection pipes of the gas supply unit 50a are connected with a lower portion of the central reaction chamber 210a, ethylene gas and hydrogen gas rise, but argon gas sinks among the gases supplied into the reaction chamber. That is, hydrogen gas rises to the upper reaction chamber 110a after passing through the central reaction chamber 210a, and ethylene gas rises to the central reaction chamber 210a, causing the gases having been already positioned in the central reaction chamber 210a to flow. Due to the flow, ethylene gas acting as the carbon source gas is actively brought into contact with the metal catalyst, allowing effective synthesis of the carbon nanotubes. In particular, since ethylene gas has the specific gravity higher than hydrogen gas but lower than argon gas, ethylene gas remains in the central reaction chamber 210a. In addition, when both upper and lower ends of the central reaction chamber 210a have a bottleneck shape, the central reaction chamber 210a functions to collect and maintain ethylene gas more easily.

Hydrogen gas having a high temperature is collected in the metal catalyst reduction unit 100a above the inlet 2a. Since the high temperature hydrogen gas has a lower specific gravity than that of the external air, the air is always located under hydrogen gas, which prevents the external air from permeating into the reaction chamber 1a. Specifically, assuming that the interior of the reaction chamber 1a remains at a temperature of about 900° C., and the exterior of the reaction chamber 1a has a temperature of about 20° C. Since 1 mole hydrogen gas (22.4 l) has a weight of 2 g at the standard state (0° C.=274 K, 1 atm), hydrogen gas has a volume increased four times according to Charles' law within the reaction chamber having the temperature of about 900° C. (1174 K), therefore 1 mole hydrogen gas (22.4 l) has a weight of about 0.5 g therein. Meanwhile, since 1 mole air (22.4 l) has a weight of 28.9 g at the standard state, 1 mole hydrogen gas (22.4 l) has a weight of about 27 g at room temperature (20° C.). In other words, since the air has the specific gravity about 54 times that of hydrogen gas at the inlet of the reaction chamber where the air is brought into contact with hydrogen gas, air is always located under hydrogen gas due to difference in specific gravity, and cannot permeate through hydrogen gas into the reaction chamber 1a. In case an inlet/outlet is opened downward direction, a gas which is lower specific gravity than that of the air in the outside for example hydrogen gas, should occupy a region near the inlet/outlet in order to prevent the air in the outside from permeate into the reaction chamber.

In addition, since argon gas having a molecular weight of 39.948 positioned under the outlet 3a of the reaction chamber is cooled by the cooling unit 300a and remains at room temperature, 1 mole argon gas (22.4 l) has a weight of about 35 g. As such, since the external air has the specific gravity lower than that of argon gas, the air is always located above argon gas, and cannot permeate through argon gas into the reaction chamber 1a. In case an inlet/outlet is opened upward direction, a gas which is higher specific gravity than that of the air in the outside for example argon gas, should occupy a region near the inlet in order to prevent the air in the outside from permeate into the reaction chamber.

A predetermined amount of hydrogen gas introduced into the reaction chamber is discharged to the outside of the reaction chamber through the hydrogen gas discharge pipe 120a of the upper reaction chamber 110a. This is for the purpose of securely preventing the external air from permeating into the reaction chamber by providing an equilibrium state between pressures of hydrogen gas and the external air at a region where hydrogen gas in the inlet 2a of the reaction chamber is brought into contact with the external air. In other words, this structure is configured to obtain equilibrium between hydrogen gas and the external air at the inlet of the reaction chamber by allowing the predetermined amount of hydrogen gas to be discharged through the separate the hydrogen gas discharge pipe 120a in order to allow an increase in pressure of hydrogen gas by an excessive amount of hydrogen gas injected into the reaction chamber through the gas injection pipe while preventing hydrogen gas from being discharged to the outside through the inlet 2a due to the increase in pressure of hydrogen gas. That is, although the predetermined amount of hydrogen gas reacts with the metal oxide catalyst upon reduction of the metal oxide catalyst, the pressure of hydrogen gas remains at a predetermined value or more within the reaction chamber by injecting hydrogen gas more than a reacted amount of hydrogen gas into the reaction chamber.

Here, since the predetermined amount of hydrogen gas is discharged to the outside through the hydrogen gas discharge pipe 120a, there occurs flow of hydrogen gas from the upper reaction chamber 110a of the metal catalyst reduction unit 100a to the hydrogen gas discharge pipe 120a, which is directed towards the inlet 2a of the reaction chamber, thereby securely preventing introduction of the external air through the inlet 2a into the reaction chamber.

According to the present invention, the mass production system of the synthesized carbon nanotubes allows various gases having different specific gravities to occupy specified regions of the reaction chamber so that external air cannot infiltrated into the reaction chamber even with the open structure of the system in which the reaction chamber is completely open.

If external air flows into the reaction chamber, oxygen contained in the air causes an oxidation reaction with the carbon source gas in an instant, thereby failing to synthesize the carbon nanotubes, and reacts with hydrogen gas, possibly causing explosion. Thus, it is necessary for the reaction chamber to have no oxygen therein.

For a conventional batch type mass production system of carbon nanotubes, which employs the vapor synthesizing method, the carbon nanotubes are synthesized after filling the reaction chamber with an inert gas to discharge oxygen and the air to the outside from the reaction chamber with the interior thereof completely blocked from the outside in order to form an oxygen-free interior of the reaction chamber.

For the conventional system as described above, it is necessary to repeat the steps of removing oxygen from the reaction chamber, heating the reaction chamber to synthesize the carbon nanotubes, cooling the reaction chamber, and withdrawing the synthesized carbon nanotubes at every process of synthesizing the carbon nanotubes, which requires an excessive preparation time for synthesis of the carbon nanotubes. As such, with the conventional mass production system for synthesized carbon nanotubes, there is a limit in an increase of productivity due to excessive time for preparation and release in comparison with time for actually synthesizing the carbon nanotubes.

On the contrary, for the mass production system for synthesized carbon nanotubes according to the present invention, reaction atmosphere required for synthesis of the carbon nanotubes is achieved and maintained only with preparation for synthesis of the carbon nanotubes at an initial stage. Accordingly, with the mass production system for synthesized carbon nanotubes according to the invention, the carbon nanotubes can be continuously synthesized without being stopped even for an instant once the system is operated.

Such continuous synthesis of the carbon nanotubes can be achieved by the system of the present invention since the metal catalyst is continuously fed into the reaction chamber which is completely opened. That is, even at a moment when the metal catalyst is fed from the exterior into the reaction chamber, the carbon nanotubes are synthesized continuously in the carbon nanotube synthesizing unit 200a.

Although the interior of the reaction chamber is completely opened with respect to external air, a specified gas of a predetermined region in the reaction chamber serves to completely block introduction of the external air into the reaction chamber. That is, gases having different specific gravities occupy specified regions within the reaction chamber, respectively, so that each gas blocks other gases from permeating into its specified region inside the reaction chamber, thereby preventing the external air from permeating into the reaction chamber. Since the gas occupying the specified region of the reaction chamber is in an equilibrium state in pressure with the external air, the external air is prevented from permeating into the reaction chamber.

FIG. 7 is a schematic cross-sectional view illustrating a mass production system for synthesized carbon nanotubes according to a sixth embodiment of the present invention. As shown in FIG. 7, the mass production system of the sixth embodiment comprises a reaction chamber 1a having a heating member and a passage 4a with an inner space defined therein to communicate with an outside of the reaction chamber, and a conveying unit 15a to convey a metal catalyst into the reaction chamber 1a through the passage 4a. The passage 4a is used for conveying the catalyst in and out of the reaction chamber, so it can be referred inlet or outlet.

The reaction chamber 1a of the mass production system according to this embodiment has the passage 4a open downwardly, and a carbon nanotube synthesizing unit 200a formed above the passage 4a inside the reaction chamber.

The reaction chamber is provided with a gas supply unit 50a, which comprises gas tanks and gas injection pipes, each connecting an associated gas tank with the reaction chamber and having an opening/closing valve, to supply carbon source gas, hydrogen gas, and an inert gas into the reaction chamber, respectively.

The carbon nanotube synthesizing unit 200a comprises a shower head 230a connected with a carbon source gas tank at an upper portion of the reaction chamber 1a and having plural injection nozzles arranged to allow uniform injection of a carbon source gas, a carbon source gas restriction part 280a positioned below the shower head 230a and opened at an upper portion, such as a box without an upper surface, to collect the carbon source gas, and a heating member 250a installed to the reaction chamber.

The carbon source gas restriction part 280a has a box structure which is surrounded by a wall having a predetermined height, and opened only at an upper portion thereof. The shower head 230a is positioned deeper from an upper end of the wall of the carbon source gas restriction part 280a. With this structure, after being injected from the shower head 230a, the carbon source gas remains inside the carbon source gas restriction part 280a. A portion of the carbon source gas overflowing from the carbon source gas restriction part 280a exists mainly at a lower space within the reaction chamber.

The shower head has an enough area to cover most area of the opened upper portion of the carbon source gas restriction part. Of course, the carbon nanotube synthesizing unit has a space for allowing entrance of a catalyst containing member into the carbon source gas restriction part, and a space for allowing exit of the catalyst containing member from the carbon source gas restriction part between the shower head and the carbon source gas restriction part. Accordingly, the shower head very efficiently prevents hydrogen having a lighter weight than the carbon source gas from entering the carbon source gas restriction part while allowing entrance and exit of the catalyst containing member into and from the carbon source gas restriction part, thereby maintaining high synthesizing yield of the carbon nanotubes.

The carbon source gas restriction part 280a has a leeway space defined at an upper portion to allow a bucket, that is, the catalyst containing member, to enter through the upper portion at one side and to leave through the upper portion at the other side. As a result, the carbon source gas positioned in the carbon source gas restriction part reacts with the metal catalyst in a reaction region formed below hydrogen gas occupying the leeway space above the carbon source gas restriction part.

The carbon source gas restriction part 280a is formed with a discharge pipe 285a through which water, a residual carbon source gas, and other by-products can be discharged. If the carbon source gas is excessively supplied into the reaction chamber, a portion of the carbon source gas is discharged to the outside through the discharge pipe 285a. The carbon source gas restriction part 280a serves to collect the carbon source gas heavier than hydrogen gas, and is not limited to the box structure. Alternatively, the carbon source gas restriction part 280a has various structures, which have an opened upper portion, a closed periphery, and the bottom surface.

The heating member attached to the reaction chamber heats the whole interior of the reaction chamber. Thus, when the bucket 10a is conveyed into the reaction chamber through the passage 4a, a metal oxide catalyst in the bucket 10a is reduced via reaction with hydrogen gas injected through the gas injection pipe and filled in the reaction chamber before the bucket 10a reaches the carbon source gas restriction part 280a, so that oxygen is removed from the reaction chamber. Accordingly, the reaction chamber itself filled with hydrogen gas serves as the metal catalyst reduction unit which reduces the metal catalyst.

Additionally, the reaction chamber is formed with a separate reduction inducing guide surface contacting one side of the carbon source gas restriction part in order to ensure reduction of the metal catalyst. The reduction inducing guide surface has a sufficient length in a lateral direction, and enables the metal oxide catalyst of the catalyst containing member to be reduced while moving for a sufficient time along an upper space of the reaction chamber. Although the present embodiment is described as comprising the separate reduction inducing guide surface, the present invention is not limited to this structure. Alternatively, the conveying unit is disposed to have a suitable conveyance path such that the catalyst containing member moves a sufficiently long distance along the upper portion of the reaction chamber before reaching the carbon source gas restriction part, allowing the metal oxide catalyst to be reduced for a sufficient time.

The passage 4a extends a predetermined distance downwardly from the reaction chamber. The reaction chamber further comprises a cooling unit 300a which is formed around the passage 4a, and comprises a cooling member 350a to cool the carbon nanotubes when the carbon nanotubes are discharge from the reaction chamber to the outside after being synthesized therein.

A hydrogen gas discharge pipe 120a is formed at one side of the passage 4a. If hydrogen gas is excessively supplied from the gas supply unit 50a, the pressure of hydrogen gas continues to increase. Thus, it is necessary to discharge a predetermined amount of hydrogen gas to the outside of the reaction chamber in order to maintain equilibrium between the pressures of hydrogen gas and external air at a region where hydrogen gas of the passage 4a contacts the external air. To this end, hydrogen gas is discharged through the hydrogen gas discharge pipe 120a instead of the passage 4a. The reason that the hydrogen gas discharge pipe 120a is formed at a lower portion of the reaction chamber is that, when hydrogen gas rises to an upper portion of the reaction chamber at a high temperature condition in the reaction chamber, hydrogen gas is prevented from being immediately discharged to the outside, but is sufficiently filled in the reaction chamber, thereby sufficiently increasing the pressure of hydrogen gas within the reaction chamber.

Since the external air outside the reaction chamber has the specific gravity higher than that of hydrogen gas, it remains below hydrogen gas. In this regard, since the passage 4a is open downwardly, the external air having the higher specific gravity is prevented from permeating into the reaction chamber filled with hydrogen gas. Furthermore, since the equilibrium state between the pressures of hydrogen gas and the external air is maintained at the region where hydrogen gas of the passage 4a contacts the external air, the external air is prevented from permeating into the reaction chamber.

Although the passage 4a is open downwardly in the mass production system of this embodiment, the external air having the higher specific gravity than that of hydrogen gas having a high temperature in the reaction chamber is always located below hydrogen gas, and thus is prevented from permeating into the reaction chamber 1a.

In this embodiment, an argon gas injection pipe is connected with the shower head of the reaction chamber. With this structure, if argon gas is injected at a reaction preparation stage, it pushes down air existing within the reaction chamber, and discharges the air through the passage, so that the interior of the reaction chamber becomes an inert gas atmosphere. Then, the carbon nanotubes are synthesized by supplying hydrogen gas along with the carbon source gas into the reaction chamber to reduce the metal catalyst. Other components and processes of the second embodiment are the same as those of the first embodiment, and thus detailed description thereof will be omitted hereinafter.

FIG. 8 is a schematic cross-sectional view illustrating a mass production system for synthesized carbon nanotubes according to a seventh embodiment of the invention. As shown in FIG. 8, the mass production system of the seventh embodiment is the same as that of the second embodiment in that it enables entrance and exit of a bucket 10a, that is, the catalyst containing member, through a passage 4a. However, the third embodiment is different from the second embodiment, particularly, in that the passage 4a is open upwardly, and is connected with a U-shaped part 300a. The mass production system of the third embodiment further comprises a conveying unit 15a which conveys the bucket 10a containing a metal oxide catalyst into a reaction chamber to synthesize carbon nanotubes, and then conveys the bucket to the outside of the reaction chamber.

The U-shaped part 400a is formed downwardly from the passage 4a, bent and horizontally extends a predetermined length, and is then connected at an extended end with a carbon nanotube synthesizing unit 200a serving to synthesize the carbon nanotubes.

The U-shaped part 400a constitutes a cooling unit 300a which comprises a cooling member 350a disposed around the U-shaped part 400a. Next to the U-shaped part 400a, a metal catalyst reduction unit 100a, and the carbon nanotube synthesizing unit 200a are formed within the reaction chamber.

The U-shaped part 400a is filled with argon gas injected through an argon gas injection pipe of a gas supply unit 50a up to a predetermined height, while being cooled by the cooling member 350a. The cooled argon gas is considerably increased in specific gravity greater than air outside the reaction chamber. Thus, the external air is always located above argon gas having the higher specific gravity at the passage 4a of the reaction chamber, thereby blocking the external air from permeating into the reaction chamber 1a. The gas occupying the U-shaped part 400a may be any of inert gases having a higher specific gravity than that of the external air as well as argon gas.

The reaction chamber has a horizontal extension part 105a, which is bent from the U-shaped part 400a and heated by a heating member installed to the outside of the reaction chamber. In the horizontal extension part 105a, hydrogen gas injected into the reaction chamber through hydrogen gas injection pipe reacts with a metal oxide catalyst introduced into the horizontal extension part 105a of the reaction chamber by the conveying unit 15a so that oxygen is removed from the metal oxide catalyst. After passing through the horizontal extension part 105a, the catalyst containing member is conveyed adjacent to a ceiling surface of a rear reaction chamber 205a. Thus, even though there is a little non-reduced metal oxide catalyst, it is reduced by hydrogen gas filled in an upper space of the rear reaction chamber 205a, so that the metal oxide catalyst is completely reduced. The horizontal extension part 105a is not limited to the length shown in FIG. 8, and has enough length to allow the metal oxide catalyst to be reduced for a sufficient time.

The rear reaction chamber 205a connected with the horizontal extension part 105a has a space of a predetermined size defined therein, and a shower head 230a installed at an upper portion to uniformly inject a carbon source gas thereto. The rear reaction chamber 205a is provided at the upper portion with a hydrogen gas discharge pipe 207a through which hydrogen, being lighter than the carbon source gas, is discharged to the outside, and at a lower portion with a heating member 250a. The metal oxide catalyst in the catalyst containing member conveyed into the rear reaction chamber 205a by the conveying unit 15a reacts with the carbon source gas while passing below the shower head 230a, and synthesizes carbon nanotubes. With the synthesized carbon nanotubes contained therein, the catalyst containing member is discharged to the outside of the reaction chamber along the same path by the conveying unit 15a.

The rear reaction chamber 205a has a bottom surface deeper than the horizontal extension part 105a, and the shower head 230a is set adjacent to the bottom surface of the rear reaction chamber 205a. With this structure, the rear reaction chamber 205a allows the carbon source gas to accumulate in a predetermined space on the bottom, which constitutes a reaction region where the metal catalyst reacts with the carbon source gas. Since the metal catalyst passes directly above the bottom of the rear reaction chamber 205a, it reacts with the carbon source gas densely accumulated thereon, thereby actively synthesizing the carbon nanotubes. In other words, the bottom of the rear reaction chamber 205a is formed deeper than the horizontal extension part 105a for the purpose of enhancing reaction efficiency by forcing the carbon source gas heavier than hydrogen gas to be accumulated in the lower space of the rear reaction chamber 205a via gravity.

Other components of the this embodiment can be easily understood with reference to the above described embodiments, and thus detailed description thereof will be omitted hereinafter.

FIG. 9 is a schematic cross-sectional view illustrating a mass production system for synthesized carbon nanotubes in accordance with a eighth embodiment of the invention. As shown in FIG. 9, the mass production system according to the eighth embodiment is the same as that of the seventh embodiment except that the mass production system of the fourth embodiment does not comprise the U-shaped part, and has a downwardly open passage.

Since hydrogen gas is filled in the reaction chamber from the passage which is opened downwardly, air outside the reaction chamber cannot be introduced into the reaction chamber. The reason that the external air cannot be introduced into the reaction chamber has been already described in the fifth and sixth embodiments, and thus repetitious description will be omitted hereinafter.

The mass production system of the fourth embodiment is different from the seventh embodiment in that a hydrogen gas discharge pipe 207a is formed upper portion of the passage. With the hydrogen gas discharge pipe 207a formed near the passage, hydrogen gas is prevented from being discharged through the passage.

In the mass production systems according to the above embodiments, if the carbon nanotube synthesizing unit 200a has an extended length, a length for the catalyst containing member to move while being subjected to reaction is increased, and thus a conveying speed of the catalyst containing member can be increased. In other words, for the case where reaction time and temperature inside the reaction chamber is specified for synthesis reaction, if the carbon nanotube synthesizing unit 200a has an extended length, it is possible to increase a speed of inputting the metal catalyst into the reaction chamber, thereby increasing productivity.

In the mass production systems of the above embodiments, although the heating member and the cooling member 350a are described as being installed at the outside of the reaction chamber, the present invention is not limited to this structure. Instead, these components can be installed at any suitable locations for heating and cooling.

According to the present invention, the mass production system may comprise one or more different-specific gravity gas occupying parts according to the shape of the reaction chamber. In addition, the different-specific gravity gas occupying parts separated from each other may be occupied with the same gas or different gases.

A mechanism for conveying the catalyst containing member may be not only a conveyor, but also any of various well-known conveying members.

The carbon source gas restriction part 280a in the reaction chamber is provided for the purpose of enhancing efficiency of synthesizing the carbon nanotubes, and serves to accumulate the carbon source gas on a specific location.

Although the embodiment of the invention comprises a separate cooling member to cool the synthesized carbon nanotubes to room temperature, the invention is not limited to this structure, and thus the carbon nanotubes may be cooled at the outside after being discharged from the reaction chamber instead of using the cooling member.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

INDUSTRIAL APPLICABILITY

The present invention can be used for the mass production system of carbon nanotubes using a vapor synthesis process. In particular, the present invention can be used for the method of synthesizing the carbon nanotubes in a great quantity using the mass production system comprising an open type reaction chamber.

The invention claimed is:

1. A mass production system for synthesized carbon nanotubes, comprising:
   a reaction chamber having at least one opening opened to external air all the time, and at least one different-specific gravity gas occupying region filled with a different specific gravity gas having a different specific gravity from that of the external air to block the external air from being introduced into the reaction chamber through the opening;
   a carbon nanotube synthesizing unit positioned in the different-specific gravity gas occupying region to synthesize carbon nanotubes by the medium of a catalyst introduced thereto through the opening;
   a conveying unit to convey the catalyst to the carbon nanotube synthesizing unit through the opening; and
   a gas supply unit to supply the different specific gravity gas and a carbon source gas used for synthesizing the carbon nanotubes to the different-specific gravity gas occupying region and the carbon nanotube synthesizing unit, respectively, wherein the opening is opened downward to the external air all the time, wherein the different specific gravity gas that fills the different-specific gravity gas occupying region has a specific gravity lower than that of the external air, and wherein the reaction chamber having the opening opened downward and the different specific gravity gas with the specific gravity lower than that of the external air are configured for contacting all the time but keeping the external air from being introduced into the reaction chamber through the opening so as to trap the different specific gravity gas with the specific gravity lower than that of the external air in the different-specific gravity gas occupying region;

wherein the opening comprises an inlet through which the catalyst is introduced into the reaction chamber, and an outlet through which the carbon nanotubes synthesized by the carbon nanotube synthesizing unit are discharged to an outside of the reaction chamber, and the conveying unit conveys the catalyst and/or the carbon nanotubes via the opening, the different-specific gravity gas occupying region, the carbon nanotube synthesizing unit, and the outlet;

wherein the different-specific gravity gas occupying region comprises a first occupying region communicated in a direction traversing the direction of gravity, a second occupying region communicated between the inlet and the first occupying region, and a third occupying region communicated between the outlet and the first occupying region, the reaction chamber being bent at the inlet and the outlet thereof so as to define the first occupying region, the second occupying region, and the third occupying region therein;

wherein the inlet and the outlet have a positional difference with respect to the first occupying region in the direction of gravity in order to prevent the different-specific gravity gas filled in the different-specific gravity gas occupying region from being discharged to the outside of the reaction chamber through the inlet and the outlet due to gravity;

wherein the carbon nanotube synthesizing unit comprises:

a reaction region defined in the reaction chamber while being blocked from the external air by the different-specific gravity gas filled in the different-specific gravity gas occupying region;

a carbon source gas injector to inject the carbon source gas supplied from the gas supply unit to the reaction region such that the catalyst conveyed into the reaction region by the conveying unit reacts with the carbon source gas, thereby synthesizing the carbon nanotubes; and a heating member to heat the reaction region;

wherein the different-specific gravity gas comprises a gas having a lower specific gravity than that of the external air, and the inlet and the outlet are located lower than the first occupying region in the direction of gravity in order to prevent the different-specific gravity gas from being discharged to the outside of the reaction chamber through either the inlet or the outlet due to gravity.

2. The mass production system according to claim 1, wherein the different-specific gravity gas is hydrogen gas having the lower specific gravity than that of the external air.

3. A mass production system for synthesized carbon nanotubes, comprising:

a reaction chamber having at least one opening opened to external air all the time, and at least one different-specific gravity gas occupying region filled with a different specific gravity gas having a different specific gravity from that of the external air to block the external air from being introduced into the reaction chamber through the opening;

a carbon nanotube synthesizing unit positioned in the different-specific gravity gas occupying region to synthesize carbon nanotubes by the medium of a catalyst introduced thereto through the opening;

a conveying unit to convey the catalyst to the carbon nanotube synthesizing unit through the opening; and a gas supply unit to supply the different specific gravity gas and a carbon source gas used for synthesizing the carbon nanotubes to the different-specific gravity gas occupying region and the carbon nanotube synthesizing unit, respectively, wherein the opening is opened downward to the external air all the time, wherein the different specific gravity gas that fills the different-specific gravity gas occupying region has a specific gravity lower than that of the external air, and wherein the reaction chamber having the opening opened downward and the different specific gravity gas with the specific gravity lower than that of the external air are configured for contacting all the time but keeping the external air from being introduced into the reaction chamber through the opening so as to trap the different specific gravity gas with the specific gravity lower than that of the external air in the different-specific gravity gas occupying region;

wherein the opening comprises an inlet through which the catalyst is introduced into the reaction chamber, and an outlet through which the carbon nanotubes synthesized by the carbon nanotube synthesizing unit are discharged to an outside of the reaction chamber, and the conveying unit conveys the catalyst and/or the carbon nanotubes via the opening, the different-specific gravity gas occupying region, the carbon nanotube synthesizing unit, and the outlet;

wherein the different-specific gravity gas occupying region comprises a first occupying region communicated in a direction traversing the direction of gravity, a second occupying region communicated between the inlet and the first occupying region, and a third occupying region communicated between the outlet and the first occupying region, the reaction chamber being bent at the inlet and the outlet thereof so as to define the first occupying region, the second occupying region, and the third occupying region therein;

wherein the inlet and the outlet have a positional difference with respect to the first occupying region in the direction of gravity in order to prevent the different-specific gravity gas filled in the different-specific gravity gas occupying region from being discharged to the outside of the reaction chamber through the inlet and the outlet due to gravity;

wherein the carbon nanotube synthesizing unit comprises:

a reaction region defined in the reaction chamber while being blocked from the external air by the different-specific gravity gas filled in the different-specific gravity gas occupying region;

a carbon source gas injector to inject the carbon source gas supplied from the gas supply unit to the reaction region such that the catalyst conveyed into the reaction region by the conveying unit reacts with the carbon source gas, thereby synthesizing the carbon nanotubes; and a heating member to heat the reaction region;

wherein the different-specific gravity gas comprises a gas having a higher specific gravity than that of the external air, and the inlet and the outlet are located higher than the first occupying region in the direction of gravity in order to prevent the different-specific gravity gas from being discharged to the outside of the reaction chamber through the inlet and the outlet due to gravity.

4. The mass production system according to claim 2, wherein the carbon source gas injector comprises a plurality of nozzles dispersedly arranged corresponding to a dimension of the reaction region to uniformly inject the carbon source gas into the reaction region.

5. The mass production system according to claim 2, further comprising:

a heating member to heat at least one region inside the reaction chamber to reduce the catalyst introduced into the reaction chamber through the opening.

6. The mass production system according to claim 2, wherein the carbon nanotube synthesizing unit comprises a carbon source restriction part opened upwardly to block the carbon source gas injected into the reaction region from escaping from the reaction region.

* * * * *